(12) United States Patent
Dastgheib et al.

(10) Patent No.: US 10,279,318 B2
(45) Date of Patent: May 7, 2019

(54) ROBUST CARBON NANOTUBE MEMBRANES AND METHODS OF MAKING THE SAME

(71) Applicant: The Board of Trustees of the University of Illinois, Urbana, IL (US)

(72) Inventors: Seyed A. Dastgheib, Savoy, IL (US); Ali Ashraf, Beaverton, OR (US); SungWoo Nam, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 26 days.

(21) Appl. No.: 15/344,697

(22) Filed: Nov. 7, 2016

(65) Prior Publication Data

US 2017/0165612 A1   Jun. 15, 2017

Related U.S. Application Data

(60) Provisional application No. 62/266,171, filed on Dec. 11, 2015.

(51) Int. Cl.
| | | |
|---|---|---|
| *B01D 71/02* | (2006.01) | |
| *C02F 1/44* | (2006.01) | |
| *B01D 67/00* | (2006.01) | |
| *B01D 61/36* | (2006.01) | |
| *B01D 61/14* | (2006.01) | |
| *B01D 61/02* | (2006.01) | |
| *C02F 103/08* | (2006.01) | |

(52) U.S. Cl.
CPC ......... *B01D 71/021* (2013.01); *B01D 61/025* (2013.01); *B01D 61/027* (2013.01); *B01D 61/147* (2013.01); *B01D 61/364* (2013.01); *B01D 67/0039* (2013.01); *C02F 1/441* (2013.01); *C02F 1/442* (2013.01); *C02F 1/444* (2013.01); *C02F 2103/08* (2013.01)

(58) Field of Classification Search
CPC combination set(s) only.
See application file for complete search history.

(56) References Cited

PUBLICATIONS

Osswald et al., "Monitoring Oxidation of Multiwalled Carbon Nanotubes by Raman Spectroscopy", J. Raman Spectrosc. 2007, 38, 728-736.
Delhaes et al., "A Comparison between Raman Spectroscopy and Surface Characterizations of Multiwall Carbon Nanotubes", Carbon 2006, 44, 3005-3013.
Park et al., "Surface Characterization of Carbon Materials by X-Ray Photoelectron Spectroscopy", Mendez-Vilas A, Diaz J. Microsc. Sci. Technol. Appl. Educ. Formatex 2010, 1905-1916.
Datsyuk et al., "Chemical Oxidation of Multiwalled Carbon Nanotubes", Carbon 2008, 46, 833-840.
Ashraf et al., "Spectroscopic Investigation of the Wettability of Multilayer Graphene Using Highly Ordered Pyrolytic Graphite as a Model Material", Langmuir 2014, 30, 12827-12836.
(Continued)

*Primary Examiner* — Dirk R Bass
(74) *Attorney, Agent, or Firm* — Dilworth IP, LLC

(57) ABSTRACT

Carbon nanotube membranes that are flexible, non-fragile, stable at high temperatures, superhydrophobic, have submicrometer openings, and are resistant to delamination and corrosive conditions are provided. The carbon nanotube membranes comprise carbon nanotubes grown on a microporous, metal substrate, e.g. silver, quartz fiber filter, and HAST. Methods of fabricating the carbon nanotubes are also provided.

9 Claims, 17 Drawing Sheets

(56) References Cited

PUBLICATIONS

Standard Test Methods for Measuring Adhesion by Tape Test; ASTM D3359; ASTM International: West Conshohocken, PA, 2005.
Azimi et al., "Hydrophobicity of Rare-Earth Oxide Ceramics", Nat. Mater. 2013, 12, 315-320.
Tomaszewska et al., "Separation of HCI from HCI—H2SO4 Solutions by Membrane Distillation", Desalination 2009, 240, 244-250.
Standard Test Methods for Pore Size Characteristics of Membrane Filters by Bubble Point and Mean Flow Pore Test; ASTM F316-03; ASTM International: West Conshohocken, PA, 2003.
Singh et al., "Desalination of brine and produced water by direct contact membrane distillation at high temperatures and pressures", J. Memb. Sci. 389 (2012) 380-388.
Laoui et al., "Novel anti-microbial membrane for desalination pretreatment: a silver nanoparticle-doped carbon nanotube membrane", Desalination 376 (2015) 82-93.
Yue et al., "Thermal transport in multiwall carbon nanotube buckypapers", Phys. Lett. A. 374 (2010) 4144-4151.
Price "Thermal conductivity of PTFE and PTFE composites", Thermochim. Acta. 392 (2002) 231-236.
Mi et al., "Vertically Aligned Carbon Nanotube Membranes on Macroporous Alumina Supports", J. Membr. Sci. 2007, 304, 1-7.
Camilli et al., "The Synthesis and Characterization of Carbon Nanotubes Grown by Chemical Vapor Deposition Using a Stainless Steel Catalyst", Carbon 2011, 49, 3307-3315.
Kasi et al., "Synthesis of Carbon Nanotube and Carbon Nanofiber in Nanopore of Anodic Aluminum Oxide Template by Chemical Vapor Deposition at Atmospheric Pressure", Adv. Mater. Res. 2012, 557-559, 544-549.
Park et al., "Development of CNT-Metal-Filters by Direct Growth of Carbon Nanotubes", Curr. Appl. Phys. 2006, 6, 182-186.
Lee et al., "The Performance of Superhydrophobic and Superoleophilic Carbon Nanotube Meshes in Water-Oil Filtration", Carbon 2011, 49, 669-676.
Gilani et al., "Separation of Methane-Nitrogen Mixtures Using Synthesis Vertically Aligned Carbon Nanotube Membranes", Appl. Surf. Sci. 2012, 258, 4819-4825.
Tuzovskaya et al., "Heat Exchange Performance of Stainless Steel and Carbon Foams Modified with Carbon Nano Fibers", Int. J. Heat Mass Transf. 2012, 55, 5769-5776.
Sano et al., "Direct Synthesis of Carbon Nanotubes on Stainless Steel Electrode for Enhanced Catalyst Efficiency in a Glucose Fuel Cell", Carbon 2013, 55, 365-368.
Sridhar et al., "Enhanced Field Emission Properties from CNT Arrays Synthesized on Inconel Superalloy", ACS Appl. Mater. Interfaces 2014, 6, 1986-1991.
Lee et al., "Vertically-Aligned Carbon Nano-Tube Membrane Filters with Superhydrophobicity and Superoleophilicity", Carbon 2010, 48, 2192-2197.
Vander et al., "Carbon Nanotube Synthesis upon Stainless Steel Meshes", Carbon 2003, 41, 659-672.
Hiraoka et al., "Synthesis of Single- and Double-Walled Carbon Nanotube Forests on Conducting Metal Foils", J. Am. Chem. Soc. 2006, 128, 13338-13339.
Inagaki, "Carbon Coating for Enhancing the Functionalities of Materials", Carbon 2012, 50, 3247-3266.
Hata et al., "Water-Assisted Highly Efficient Synthesis of Impurity-Free Single-Walled Carbon Nanotubes", Science 2004, 306, 1362-1364.
Pattinson et al., "Mechanism and Enhanced Yield of Carbon Nanotube Growth on Stainless Steel by Oxygen-Induced Surface Reconstruction", Chem. Mater. 2015, 27, 932-937.
Sano et al., "Cr as a Key Factor for Direct Synthesis of Multi-Walled Carbon Nanotubes on Industrial Alloys", Chem. Eng. J. 2013, 242, 278-284.
Lawson et al., "Membrane Distillation", J. Membr. Sci. 1997, 124, 1-25.

Preston et al., "Scalable Graphene Coatings for Enhanced Condensation Heat Transfer", Nano Lett. 2015, 15, 2902-2909.
Journet et al., "Contact Angle Measurements on Superhydrophobic Carbon Nanotube Forests: Effect of Fluid Pressure", Europhys. Lett. 2005, 71, 104.
Zhang et al., "Single-Walled Carbon Nanotube Pillars: A Superhydrophobic Surface", Langmuir 2009, 25, 4792-4798.
De Nicola et al., "Super-Hydrophobic Multi-Walled Carbon Nanotube Coatings for Stainless Steel", Nanotechnology 2015, 26, 145701.
Lau et al., "Superhydrophobic Carbon Nanotube Forests", Nano Lett. 2003, 3, 1701-1705.
Joseph et al., "Slippage of Water Past Superhydrophobic Carbon Nanotube Forests in Microchannels", Phys. Rev. Lett. 2006, 97, 156104.
Jeong et al., "Stable Hierarchical Superhydrophobic Surfaces Based on Vertically Aligned Carbon Nanotube Forests Modified with Conformal Silicone Coating", Carbon 2014, 79, 442-449.
Hummer et al., "Water Conduction through the Hydrophobic Channel of a Carbon Nanotube", Nature 2001, 414, 188-190.
Holt et al., "Fast Mass Transport through Sub-2-Nanometer Carbon Nanotubes", Science 2006, 312, 1034-1037.
Majumder et al., "Hydrodynamics: Enhanced Flow in Carbon Nanotubes", Nature 2005, 438, 44.
Das et al., "Carbon Nanotube Membranes for Water Purification: A Bright Future in Water Desalination", Desalination 2014, 336, 97-109.
Drioli et al., "Membrane Distillation: Recent Developments and Perspectives", Desalination 2015, 356, 56-84.
Gethard et al., "Water Desalination Using Carbon-Nanotube-Enhanced Membrane Distillation", ACS Appl. Mater. Interfaces 2010, 3, 110-114.
Wang et al., "Recent Advances in Membrane Distillation Processes: Membrane Development, Configuration Design and Application Exploring", J. Membr. Sci. 2015, 474, 39-56.
Dumée et al., "Characterization and Evaluation of Carbon Nanotube Bucky-Paper Membranes for Direct Contact Membrane Distillation", J. Membr. Sci. 2010, 351, 36-43.
Hashempour et al., "Direct Growth of MWCNTs on 316 Stainless Steel by Chemical Vapor Deposition: Effect of Surface Nano-Features on CNT Growth and Structure", Carbon 2013, 63, 330-347.
Martinez-Hanson et al., "Development of Aligned Carbon Nanotubes Layers over Stainless Steel Mesh Monoliths", Catal. Today 2009, 147, 71-75.
He et al., "Chiral-Selective Growth of Single-Walled Carbon Nanotubes on Stainless Steel Wires", Carbon 2012, 50, 4294-4297.
Baddour et al., "A Simple Thermal CVD Method for Carbon Nanotube Synthesis on Stainless Steel 304 without the Addition of an External Catalyst", Carbon 2009, 47, 313-318.
Mata et al., "Wet-Etched Ni Foils as Active Catalysts towards Carbon Nanofiber Growth", Carbon 2010, 48, 2839-2854.
Alvarez et al., "Abrasion as a Catalyst Deposition Technique for Carbon Nanotube Growth", J. Am. Chem. Soc. 2009, 131, 15041-15048.
Kim et al., Synthesis of Vertically-Aligned Carbon Nanotubes on Stainless Steel by Water-Assisted Chemical Vapor Deposition and Characterization of Their Electrochemical Properties:, Synth. Met. 2010, 160, 584-587.
Han et al., "Dense Arrays of Vertically Aligned, Large-Diameter Single-Walled Carbon Nanotubes", J. Am. Chem. Soc. 2012, 134, 6018-6024.
Lepro et al., "Spinnable Carbon Nanotube Forests Grown on Thin, Flexible Metallic Substrates", Carbon 2010, 48, 3621-3627.
Chandrakishore et al., "Electrophoretic Deposition of Cobalt Catalyst Layer over Stainless Steel for the High Yield Synthesis of Carbon Nanotubes", Appl. Surf. Sci. 2012, 258, 7936-7942.
Zheng et al., "Ultralong Single-Wall Carbon Nanotubes", Nat. Mater. 2004, 3, 673-676.
Du et al., "CVD Growth of Carbon Nanotubes Directly on Nickel Substrate", Mater. Lett. 2005, 59, 1678-1682.
Park et al., "Precise Control of Elastocapillary Densification of Nanostructures via Low-Pressure Condensation", J. Micromech. Microeng. 2014, 24, 65019.

(56) References Cited

PUBLICATIONS

Shimizu et al., "Effect of Plasma Conditions on Fabrication of Multi-Walled Carbon Nanotubes Grown Perpendicularly on Hastelloy C276®", Diam. Relat. Mater. 2005, 14, 11-15.
Romero et al., "Simultaneous Synthesis of Vertically Aligned Carbon Nanotubes and Amorphous Carbon Thin Films on Stainless Steel", Carbon 2015, 82, 31-38.
Geissler et al., "Effect of Hydrogen Pressure on the Size of Nickel Nanoparticles Formed during Dewetting and Reduction of Thin Nickel Films", J. Phys. Chem. C 2009, 114, 89-92.
Hashempour et al., "Effects of CVD Direct Growth of Carbon Nanotubes and Nanofibers on Microstructure and Electrochemical Corrosion Behavior of 316 Stainless Steel", Mater. Charact. 2014, 92, 64-76.
Dresselhaus et al., "Perspectives on Carbon Nanotubes and Graphene Raman Spectroscopy", Nano Lett. 2010, 10, 751-758.

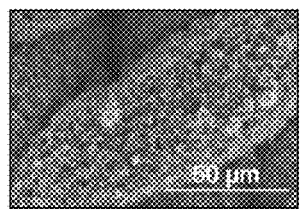 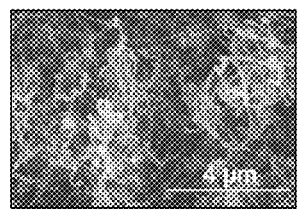 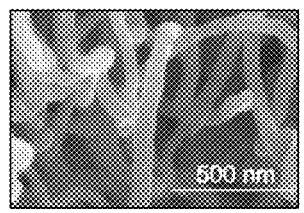
FIG. 1A1  FIG. 1A2  FIG. 1A3
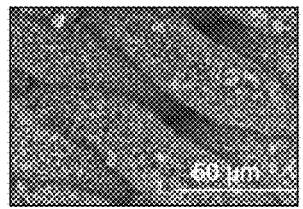 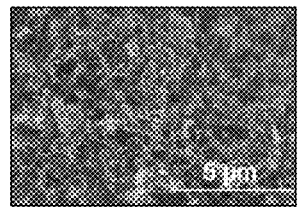 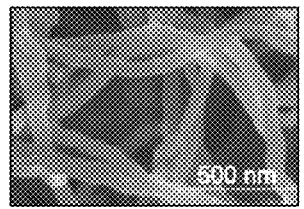
FIG. 1B1  FIG. 1B2  FIG. 1B3

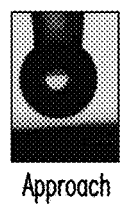
Approach
FIG. 2A1
Contact
FIG. 2A2
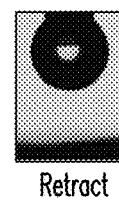
Retract
FIG. 2A3
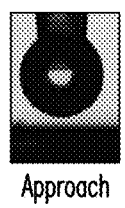
Approach
FIG. 2A4
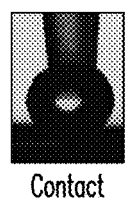
Contact
FIG. 2A5
Retract
FIG. 2A6
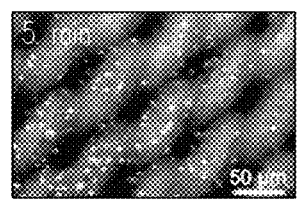
FIG. 2B1
FIG. 2B2
FIG. 2B3
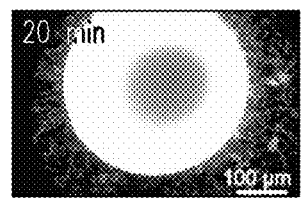
FIG. 2B4

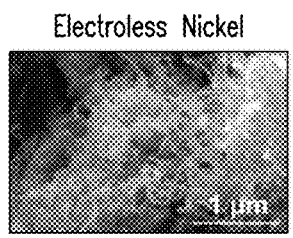
Electroless Nickel
FIG. 12A1
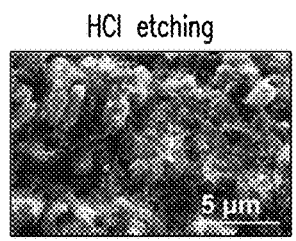
HCl etching
FIG. 12A2
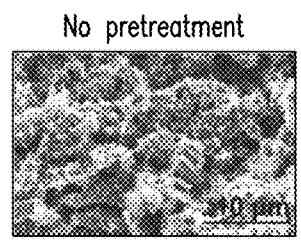
No pretreatment
FIG. 12A3
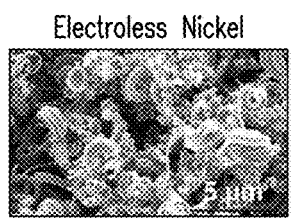
Electroless Nickel
FIG. 12B1
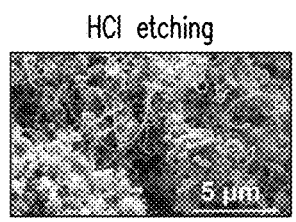
HCl etching
FIG. 12B2
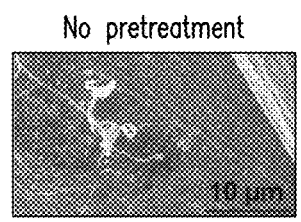
No pretreatment
FIG. 12B3
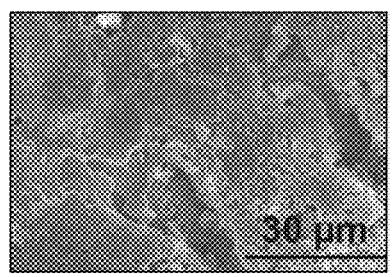
FIG. 13A
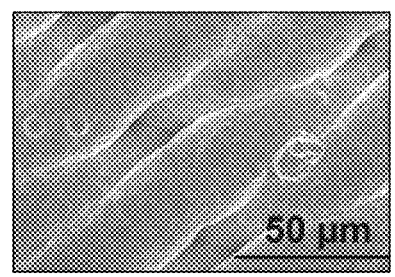
FIG. 13B

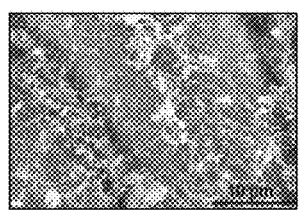
FIG. 17A1
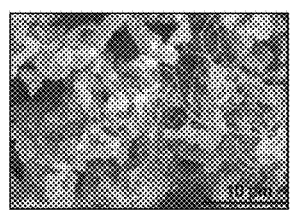
FIG. 17B1
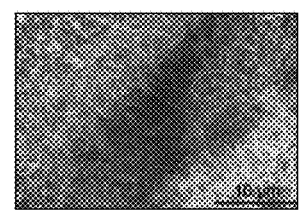
FIG. 17C1
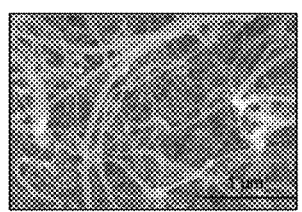
FIG. 17A2
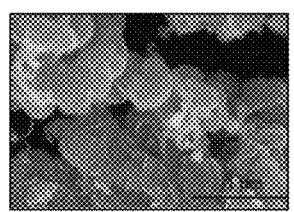
FIG. 17B2
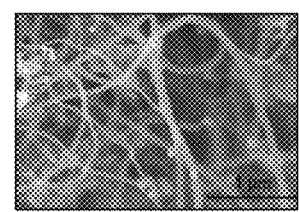
FIG. 17C2
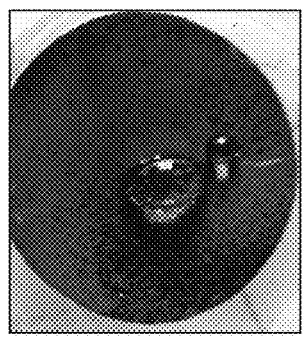
FIG. 18A
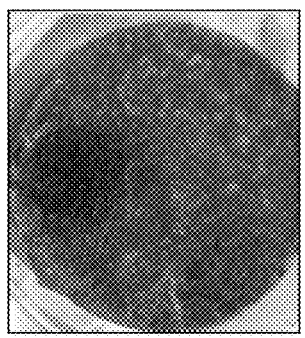
FIG. 18B
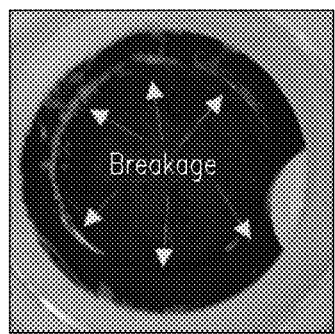
FIG. 18C

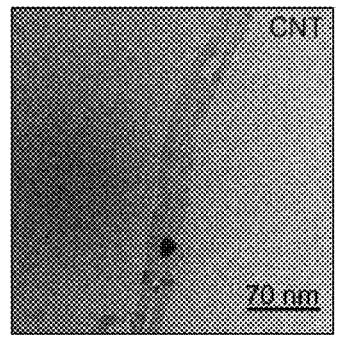
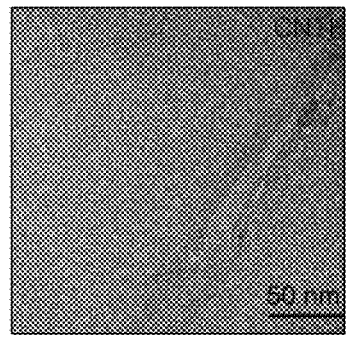
FIG. 19A          FIG. 19B
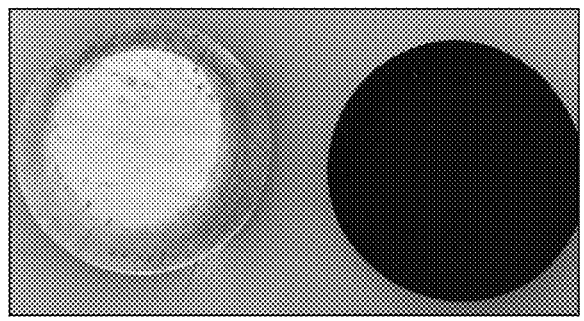
FIG. 20A
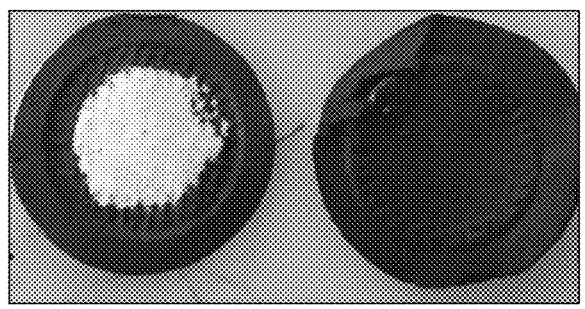
FIG. 20B

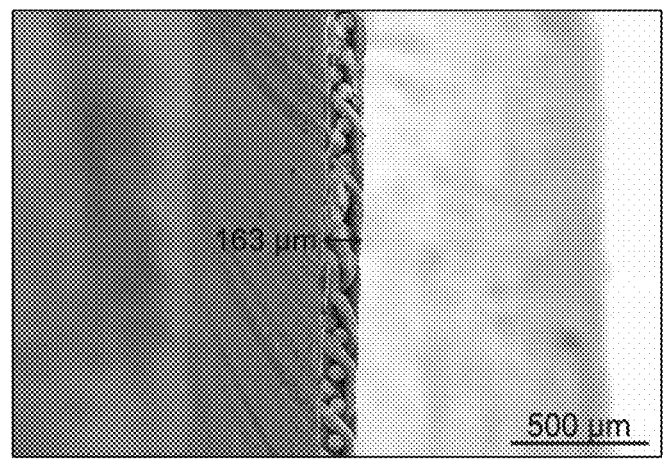
FIG. 22
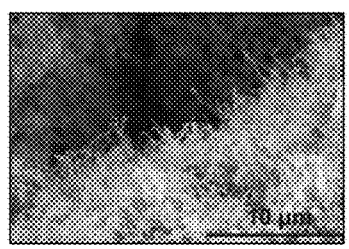    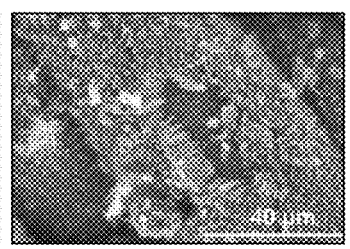    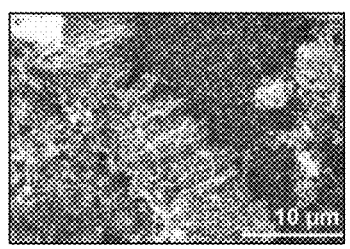
FIG. 23A          FIG. 23B          FIG. 23C

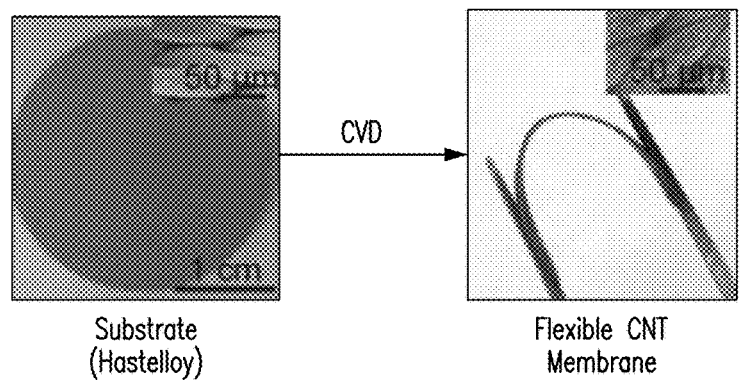
Substrate (Hastelloy)
FIG. 24A
Flexible CNT Membrane
FIG. 24B
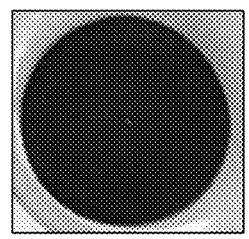
No Corrosion in HCl/NaCl
FIG. 24C
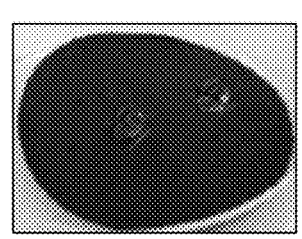
Superhydrophobic
FIG. 24D

ROBUST CARBON NANOTUBE MEMBRANES AND METHODS OF MAKING THE SAME

RELATED APPLICATION

This application claims priority to U.S. Provisional Patent Application Ser. No. 62/266,171 filed on Dec. 11, 2015, the disclosure of which is incorporated by reference herein in its entirety.

FEDERAL FUNDING LEGEND

This invention was made with government support under DE-FE0024015 awarded by U.S. Department of Energy. The government has certain rights in the invention.

FIELD OF THE INVENTION

The present invention relates to carbon nanotube membranes that are flexible, non-fragile, stable at high temperatures, superhydrophobic, have submicrometer openings, and are resistant to delamination and corrosive conditions. The carbon nanotube membranes comprise carbon nanotubes grown on a microporous, metal substrate, e.g. silver, quartz fiber filter, and corrosion-resistant metal alloys such as Hastelloy alloys, or HAST. Methods of fabricating the carbon nanotubes are also provided.

BACKGROUND OF THE INVENTION

The growth of carbon nanotubes (CNT) on metal substrates (CNTM) has been a subject of interest for the last two decades because of the immense potential of CNTM as functional materials for filtration, sensing, energy storage, and heat transfer (References 1-9). Carbon nanotube on metal substrate materials have been developed on sheet or powder substrates or mesh screens with large openings (References 4, 10, and 11). A substantial number of studies have been conducted to understand the CNT growth mechanism, characterize the quality of CNT, and evaluate potential applications of CNTM by considering their mechanical and electrical properties (References 9 and 11-16). However, to the best of our knowledge, the development of CNTM on suitable porous or mesh screen substrates, as a method for membrane fabrication, has not been investigated.

Carbon nanotubes grown on metal substrates can have superior hydrophobicity, which is a critical property for many applications, such as membrane distillation and condensation heat transfer (References 17 and 18). It is also critical for the grown CNT in the CNTM material to maintain its interfacial bonding and resist delamination when the materials are exposed to high humidity, corrosive gases, or corrosive conditions in aqueous solutions. A limited number of reports have been published on the surface wettability of CNTM materials, but no work has been identified that evaluates the performance and stability of CNTM in humid conditions or corrosive environments (References 5, 10, 19, and 21). For example, De Nicola and co-workers reported that multiwalled CNT grown on stainless steel (SS) have a superhydrophobic property (water contact angle of 154°), and Zhang and Resasco showed that aligned single-walled CNT are superhydrophobic (References 20 and 21). The deposition of hydrophobic coatings, such as Teflon, gold thiol, and silicone, on top of the CNT forest has also been reported to make the forest superhydrophobic (References 22, 23, and 24). However, the thermal or chemical stability of these or other superhydrophobic CNTM materials for practical applications has not been investigated.

Hydrophobic CNT is a material of interest for water desalination because of the unique nanoscale interactions occurring along the graphitic walls, leading to fluxes several orders of magnitude higher than values predicted by continuum hydrodynamics theory (References 25, 26 and 27). Membrane distillation, a desalination technology that purifies water by allowing only water vapor to pass through hydrophobic pores, can benefit greatly from the availability of suitable CNT membranes with high hydrophobicity, enhanced flux, and resistivity to microbial fouling (Reference 28). Even though the commercial potential of CNT membranes has been shown, commercially viable, robust CNT membranes have not yet emerged. The higher manufacturing cost involved with micro- and nanofabrication of CNT membranes, the health hazards caused by the presence of CNT in a permeate after dislodging (because of weak interfacial bonding) from the membrane, and the stability of the CNT under realistic application conditions (e.g., high temperature, an oxidative atmosphere, or a corrosive environment) are some of the major challenges involved with producing a viable CNT membrane (Reference 28).

SUMMARY OF THE INVENTION

The present invention relates to carbon nanotube membranes that are flexible, non-fragile, stable at high temperatures, superhydrophobic, have submicrometer openings, and are resistant to delamination and corrosive conditions. The carbon nanotube membranes comprise carbon nanotubes grown on a microporous, metal substrate, e.g. silver, quartz fiber filter, and HAST. Methods of fabricating the carbon nanotubes are also provided.

BRIEF DESCRIPTION OF THE DRAWINGS

The features, objects and advantages other than those set forth above will become more readily apparent when consideration is given to the detailed description below. Such detailed description makes reference to the following drawings, wherein:

FIG. 1A1, FIG. 1A2, FIG. 1A3, FIG. 1B1, FIG. 1B2, and FIG. 1B3 show membranes with various treatments. FIG. 1A1, FIG. 1A2, and FIG. 1A3 are at a 50 µm scale, a 4 µm scale, and a 500 nm scale, respectively, and show a CNTH membrane with an air oxidation pretreatment. FIG. 1B1, FIG. 1B2, and FIG. 1B3 are at a 50 µm scale, a 5 µm scale, and a 500 nm scale, respectively, and show a 50 nm nickel-sputtering pretreatment. Both membranes were prepared by CNT growth on a Hastelloy mesh at 750° C.

FIG. 2A1, FIG. 2A2, FIG. 2A3, FIG. 2A4, FIG. 2A5, FIG. 2A6, FIG. 2B1, FIG. 2B2, FIG. 2B3 and FIG. 2B4 show the behavior of water droplets. FIG. 2A1-2A6 (six images total) depict goniometer results showing the non-sticking behavior of a water droplet to CNTH-750 and Bucky Paper (BP). FIG. 2A1 shows the approach, FIG. 2A2 shows the contact, and FIG. 2A3 shows the retraction of the droplet, respectively for CNTH-750. FIG. 2A shows the approach, FIG. 2A5 shows the contact, and FIG. 2A6 shows the retraction of the droplet, respectively for BP. Because the water droplet did not stick to the substrate for either CNTH-750 or Bucky Paper, no water contact angle could be measured. FIG. 2B1, FIG. 2B2, FIG. 2B3, and FIG. 2B4 (four images total) depict water droplet condensation on CNTH observed by using E-SEM. Droplets coalesce and become bigger with time but do not spread on the surface. The time labels in the upper left corner of the images represent elapsed time after reaching 100% saturation pressure. FIG. 2B1 is an image at 5 minutes (50 µm scale). FIG. 2B2 is an image at 6 minutes (40 µm scale). FIG. 2B3 is an image at 7 minutes (50 µm scale). FIG. 2B4 is an image at 20 minutes (100 µm scale).

FIG. 3A shows Raman spectra of CNTH membranes prepared at different temperatures. The bottom spectrum (lighter weight line) is at 750° C. and the top spectrum (heavier weight line) is at 600°. FIG. 3B shows a TEM image of CNT from CNTH prepared at 750° C. (100 nm scale).

FIG. 4A shows a thermogravimetric analysis of commercial CNT (lighter weight line) (weight change of sample shown on the left axis), and CNTH-750 (dashed line) and as-received HAST substrate (heavier weight line) (weight change of sample shown on the right axis). FIG. 4B shows nitrogen isotherms at 77 K used for the Brauner-Emmett-Teller surface area analysis. CNTH-750 adsorption data are based on the weight of grown CNT on the CNTH-750 membrane. Braunner-Emmett-Teller theory is used to explain the physical adsorption of gas molecules on a solid surface and provides the basis of an analytical technique for the measurement of the specific surface area of a material.

FIG. 5A is a survey scan, and FIG. 5B is a high-resolution spectrum with curve fitting.

FIG. 6A, FIG. 6B1 and FIG. 6B2 depict results from adhesion, ultrasonication, and corrosion tests. FIG. 6A is composed of eight images total and shows a comparison between CNTH-750 (top four images) and BP (bottom four images) of interfacial bonding by the adhesion (left column of four images) and ultrasonication tests (right column of four images). CNTH-750 shows superior interfacial bonding compared with BP. FIG. 6B1 and FIG. 6B2 show a comparison of corrosion resistance between CNTH-750 (FIG. 6B1) after exposure to concentrated HCl (37%) for 30 min and concentrated NaCl solution (70,000 mg/L) for 24 h, and CNTSS-750 (FIG. 6B2) after exposure to deionized water for 2 days. CNTH-750 is resistant to the concentrated acid and salt solution, whereas CNTSS-750 corrodes when exposed to deionized water.

FIG. 7A provides salt rejection data (percent NaCl rejection at 45 and 300 minutes), FIG. 7B shows water flux as a function of time for multicycle 45 minute tests, and FIG. 7C shows water flux as a function of time for 300 minute tests.

FIG. 9 shows seven images, from top to bottom: mixture of a-c and CNT with 2 µm scale, predominantly CNT with 2 µm scale, mixture of a-c and spherical carbon at 2 µm scale, dense growth at 20 µm scale, sparse growth at 20 µm scale, predominantly a-c at 5 µm scale, and mixture of a-c and CNT at 5 µm scale.

FIG. 12A1, FIG. 12A2, FIG. 12A3, FIG. 12B1, FIG. 12B2, and FIG. 12B3 show the effect of dipping in an electroless nickel solution (without the strike solution), HCl treatment, and no pretreatment. FIG. 12A1 shows treatment on SS with electroless nickel solution at 1 µm scale. FIG. 12A2 shows treatment with HCl etching at 5 µm scale. FIG. 12A3 show no pretreatment at 10 µm scale. FIG. 12A1, FIG. 12A2, and FIG. 12A3 are all at a growth temperature of 600° C. FIG. 12B1 shows treatment on HAST with electroless nickel solution at 5 µm scale. FIG. 12B2 shows treatment with HCl etching at 5 µm scale. FIG. 12B3 shows no pretreatment at a 10 µm scale. FIG. 12B1, FIG. 12B2, and FIG. 12B3 are all at a growth temperature of 600° C.

FIG. 13A and FIG. 13B show the effect of HCl treatment at 30 µm scale (FIG. 13A) and dipping in an electroless nickel solution after HCl pretreatment at 50 µm scale (FIG. 13B) on SS at a growth temperature of 750° C.

FIG. 15A is at a 4 µm scale. FIG. 15B is at a 10 µm scale. FIG. 15C is at a 50 µm scale.

(FIG. 16A and FIG. 16B), triple dipping in a catalyst solution and growth at 600° C. (FIG. 16C and FIG. 16D), long dewetting of 50 nm sputtered nickel (20 min at 750° C.) followed by growth at 750° C. (FIG. 16E), and short dewetting of 5 nm sputtered nickel (1 min at 750° C.) followed by growth at 750° C. (FIG. 16F) on a tissue quartz substrate.

FIG. 17A1, FIG. 17A2, FIG. 17B1, FIG. 17B2, FIG. 17C1, and FIG. 17C2 show a comparison of methods used in the literature with our method: FIG. 7A1 is an image at a 10 µm scale and FIG. 17A2 is an image at a 1 µm scale, and show CNTH prepared by the method of Pattinson and co-workers (Reference 15). FIG. 17B1 is an image at a 10 µm scale and FIG. 17B2 is an image at a 1 µm scale, and shows CNTH prepared by the method of Vander Wal and Hall (Reference 11). FIG. 17C1 is an image at a 10 µm scale and FIG. 17C2 is an image at a 1 µm scale, and shows CNTH prepared by our method at 750° C.

FIG. 18A, FIG. 18B, and FIG. 18C show the corrosion and mechanical strength of SS samples. Corrosion phenomenon observed in SS membranes: FIG. 18A is an image captured immediately after placing water droplets on a CNTSS membrane. FIG. 18B is an image captured 2 days after placing water droplets on the membrane. Mechanical strength of SS samples: FIG. 18C shows that a CNTSS membrane broke when clamped with a silicone O-ring at the contact line.

FIG. 19A and FIG. 19B show transmission electron microscopy images of (FIG. 19A) of a commercial CNT (used for fabrication of the BP used in this work) and (FIG. 19B) of the CNT grown on CNTH-750.

FIG. 20A and FIG. 20B show a comparison of the mechanical strength of (FIG. 20A) CNTH-750 with (FIG. 20B) a commercial BP. Upon opening the membrane holder, the BP membrane was torn apart, whereas the CNTH-750 membrane remained intact. The white discs on the left of each figure are the support filters used for packing the tested membranes.

FIG. 22 is a scanning electron microscopy image of a cross-section of a CTNH-750 membrane.

FIG. 23A, FIG. 23B, and FIG. 23C show scanning electron microscopy image of CNTH-750 membrane before (FIG. 23A) and after gentle scratching at lower (FIG. 23B) and higher (FIG. 23C) magnification. The thickness of the CNT bundle from these images can be estimated as 10 μm.

FIG. 24A, FIG. 24B, FIG. 24C, and FIG. 24D is a graphical abstract showing flexibility, hydrophobicity, and corrosion resistance of the CNTH-750 membrane. FIG. 24A is of the hastelloy mesh substrate. FIG. 24B shows the flexibility and resistance to bending of the CNTH-750 membrane. FIG. 24C shows the superhydrophobic characteristic of the CNTH-750 membrane. FIG. 24D shows the CNTH-750 membrane after long exposure to concentrated HCl and saline water (no sign of corrosion or disintegration of the membrane is observed).

Figure 3A:
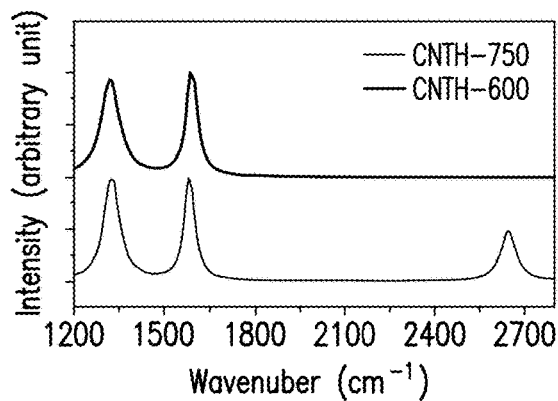
FIG. 3A and FIG. 3B show Raman spectra and transmission electron microscopy (TEM) results.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION OF THE INVENTION

The machines now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the machines described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

The Following Definitions and Abbreviations are used herein:

BP—Bucky paper
CNT—carbon nanotubes
CNTH—carbon nanotubes on Hastelloy substrate
CNTH-600—carbon nanotubes on Hastelloy substrate processed at 600° C.
CNTH-750—carbon nanotubes on Hastelloy substrate processed at 750° C.
CNTM—carbon nanotubes on metal substrate
CNTQ—carbon nanoubes on quartz substrate
CNTS—carbon nanotubes on silver substrate
CNTSS—carbon nanotubes on stainless steel
CVD—chemical vapor deposition
DCMD—direct contact membrane distillation
E-SEM—environmental scanning electron microscopy
HAST—Hastelloy. Hastelloy is a registered trademark of Haynes international, Inc., Kokomo, Ind., and is applied as the prefix name of a range of various highly corrosion-resistant metal alloys, that are grouped as superalloys or high-performance alloys. The predominant alloying ingredient for Hastelloys is typically the transition metal nickel. Other alloying ingredients are added to nickel in each of the subcategories of this trademark designation and include varying percentages of the elements aluminum, carbon, chromium, cobalt, copper, ion, manganese, molybdenum, titanium, tungsten, and zirconium.
nm—which is the symbol for nanometer
SCCM—standard cubic centimeters per minute
SEM—scanning electron microscopy
SS—stainless steel
Superhydrophobic as used herein means a surface that is highly hydrophobic and thus extremely difficult to wet, typically with the contact angles of a water droplet exceeding 150 degrees and the roll-off angle/contact and angle hysteresis less than 10 degrees. Superhydrophobic is synonymous with the term ultrahydrophobic.
μm—which is the symbol for micrometer or micron
TEM—transition electron microscopy
XPS—X-ray photoelectron spectroscopy The present invention relates to a carbon nanotube membrane comprising a substrate coated with carbon nanotubes.

In another aspect, the present invention relates to a carbon nanotube membrane comprising a substrate coated with carbon nanotubes.

In another aspect, the present invention relates to a carbon nanotube membrane wherein the substrate is a metal.

In another aspect, the present invention relates to a carbon nanotube membrane wherein the substrate has micrometer-sized openings.

In another aspect, the present invention relates to a carbon nanotube membrane wherein the metal substrate is microporous.

In another aspect, the present invention relates to a carbon nanotube membrane wherein the substrate is selected from silver, nickel sputtered silver, Hastelloy C22 (HAST) and quartz fiber filter.

In another aspect, the present invention relates to a carbon nanotube membrane wherein the substrate is HAST.

In another aspect, the present invention relates to a carbon nanotube membrane, wherein the carbon nanotube membrane has uniform and dense coverage of carbon nanotubes on the substrate.

In another aspect, the present invention relates to a carbon nanotube membrane, wherein the carbon nanotube membrane is resistant to temperatures up to about 500° C.

In another aspect, the present invention relates to a carbon nanotube membrane, wherein the carbon nanotube membrane is hydrophobic.

In another aspect, the present invention relates to a carbon nanotube membrane, wherein the carbon nanotube membrane is superhydrophobic.

In another aspect, the present invention relates to a carbon nanotube membrane, wherein the carbon nanotube membrane is hydrophilic.

In another aspect, the present invention relates to a carbon nanotube membrane, wherein the carbon nanotube membrane has pore openings of about 0.5 nm to about 500 nm.

In another aspect, the present invention relates to a carbon nanotube membrane, wherein the carbon nanotube membrane has pore openings of about 1 nm to about 500 nm.

In another aspect, the present invention relates to a carbon nanotube membrane, wherein the carbon nanotube membrane has pore openings of about 10 nm to about 250 nm.

In another aspect, the present invention relates to a carbon nanotube membrane, wherein the carbon nanotube membrane has pore openings of about 50 nm to about 100 nm.

In another aspect, the present invention relates to a carbon nanotube membrane, wherein the carbon nanotube membrane has pore openings of about 0.50 nm to about 20 nm.

In another aspect, the present invention relates to a carbon nanotube membrane, wherein the carbon nanotube membrane has pore openings of about 50 nm to about 500 nm.

In another aspect, the present invention relates to a carbon nanotube membrane, wherein the carbon nanotube membrane is flexible, non-fragile, and resistant to delamination and corrosive conditions.

In another aspect, the present invention relates to a method of making a carbon nanotube membrane, the method comprising:
  a). placing a substrate inside a tube purged with an inert or noble gas;
  b). gradually heating the tube to a temperature of about 600° C. to about 800° C.;
  c). incubating the substrate in the presence of a carbon source, hydrogen and water for about 15 minutes to about 120 minutes to produce a carbon nanotube coated substrate; and
  d). cooling the carbon nanotube coated substrate to about 20° C. under a flow of a noble gas.

In another aspect, the present invention relates to a method of making a carbon nanotube membrane, the method comprising:
  a). placing a substrate inside a tube purged with an inert or noble gas;
  b). gradually heating the tube to a temperature of about 600° C. to about 800° C.;
  c). oxidizing the substrate in air, oxygen, or alternatively another oxidizing agent for a period from about 5 minutes to about 60 minutes;
  d). incubating the substrate in the presence of a carbon source, hydrogen and water for about 15 minutes to about 120 minutes to produce a carbon nanotube coated substrate; and
  e). cooling the carbon nanotube coated substrate to about 20° C. under a flow of a noble gas.

In another aspect, the present invention relates to a method, wherein the substrate is a microporous metal.

In another aspect, the present invention relates to a method, wherein the substrate is selected from silver, nickel sputtered silver, Hastelloy C22 (HAST) and quartz fiber filter.

In another aspect, the present invention relates to a method, wherein the tube is quartz.

In another aspect, the present invention relates to a method, wherein the tube in step b) is gradually heated to about 700° C. to about 800° C.

In another aspect, the present invention relates to a method, wherein the tube in step b) is gradually heated to about 600° C.

In another aspect, the present invention relates to a method, wherein the tube in step b) is gradually heated to about 750° C.

In another aspect, the present invention relates to a method, wherein the tube in step b) is gradually heated to about 800° C.

In another aspect, the present invention relates to a method, wherein the substrate is supported by steel discs or wound wires to prevent bending under thermal stress.

In another aspect, the present invention relates to a method according, wherein the gradual heating of the tube in step b) is at a rate of about 10° C. to about 50° C. per min.

In another aspect, the present invention relates to a method, wherein acetylene and benzene are used as the carbon source.

In another aspect, the present invention relates to a method, wherein the substrate is reduced, annealed or dewetted prior to step a).

In another aspect, the present invention relates to method, wherein the substrate is reduced for about 10 minutes to about 20 minutes at a temperature of about 600° C. to about 800° C. in the presence of (i) an inert or noble gas, or (ii) hydrogren, or (iii) a mixture or an inert or noble gas and hydrogen.

In another aspect, the present invention relates to a method, wherein the substrate is annealed for about 20 minutes at a temperature of about 600° C. to about 800° C. in the presence of Argon and Hydrogen.

In another aspect, the present invention relates to a method, wherein the substrate is placed perpendicular to the gas flow and the gas flow direction switches from one direction to the other.

In another aspect, the present invention relates to a method, wherein the direction of the flow of gas reverses about every 5 minutes.

In another aspect, the present invention relates to a carbon nanotube membrane made by a method as described herein.

In another aspect, the present invention relates to a carbon nanotube membrane which is resistive to corrosion in acids or salt solutions.

In another aspect, the present invention relates to a carbon nanotube membrane which is resistive to corrosion in acids or salt solutions, wherein the acid is selected from hydrochloric acid, sulfuric acid, phosphoric acid, and nitric acid and wherein the salt solution is selected from a solution of sodium chloride or calcium chloride.

In another aspect, the present invention relates to carbon nanotube which is resistant to corrosion in water or humid conditions.

In another aspect, the present invention relates to a carbon nanotube membrane which is resistive to delamination and disintegration of the CNT structure, as determined in an adhesion performance test according to ASTM D3359 or as determined in a sonication performance test for 40 seconds at a frequency of 20 KHz and an input energy of 240 W/L using a Fisher Scientific F550 sonic dismembrator or equivalent instrument.

In another aspect, the present invention relates to a carbon nanotube membrane which is resistant to bending.

In another aspect, the present invention relates to a method for producing substantially pure water from seawater, brackish water, saline water, or waste water using a carbon nanotube membrane according to the present invention.

In another aspect, the present invention relates to a method for water desalination using a carbon nanotube membrane according to the present invention.

In another aspect, the present invention relates to a method for water desalination, wherein the desalination is performed by direct contact membrane distillation.

In another aspect, the present invention relates to a method for water desalination operating with a feed solution total dissolved solids (TDS) concentration between 1000 ppm to 300000 ppm.

In another aspect, the present invention relates to a method for microfiltration of a fluid using a carbon nanotube membrane according to the present invention.

In another aspect, the present invention relates to a method of microfiltration of a fluid for separating microorganisms or particles from the fluid.

In another aspect, the present invention relates to a method for microfiltration of a fluid such as water wherein a flow of water, air, or a vacuum is used on the permeate side (the side of the membrane from which the liquid flows, which is in contrast to the side of the membrane from which the liquid is fed) of the carbon nanotube membrane in a membrane distillation system.

In another aspect, the present invention relates to a method for recovering a dissolved material such as a solvent from a solution using a carbon nanotube membrane according to the present invention.

In another aspect, the present invention relates to a method for direct contact membrane distillation using a carbon nanotube membrane according to the present invention.

In another aspect, the present invention relates to a method for water purification by reverse osmosis or nanofiltration using a carbon nanotube membrane according to the present invention.

Overview

The current disclosure presents a new class of robust carbon nanotube (CNT) membranes developed using a scalable chemical vapor deposition method by direct growth of the CNT on a nickel alloy (Hastelloy is an example of nickel-based steel alloys) mesh substrate with micrometer-sized openings. The developed membranes had a dense, entangled network of CNT with 50 to 500 nm pore openings and were superhydrophobic, thus having the desired properties for the membrane distillation application. Our CNT membranes were resistant to air oxidation up to ~500° C. and chemical corrosion in concentrated HCl or NaCl solutions. Unlike conventional CNT Bucky papers, the developed CNT membranes were resistant to delamination and demonstrated a high interfacial bonding of the grown CNT with the alloy substrate, as confirmed by adhesion and ultrasonication tests. We further explored potential application of the developed CNT-Hastelloy membranes for separation by conducting membrane distillation tests using a 10,000 mg/L NaCl solution. The developed membranes showed similarly high (>97%) salt rejection performance compared with a baseline polymeric or carbon bucky paper membrane but exhibited higher normalized water flux values and superior performance during multicycle tests. These robust carbon membranes are reusable and expected to be less susceptible to fouling because of their superhydrophobic properties. Furthermore, if fouled by organic or inorganic species, they can be regenerated by heating in air or using an acid wash.

The prior art in this area has disclosed the growth of CNTs on stainless steel support meshes. However, these prior meshes have wide openings (e.g., >40 micrometers, i.e. >40,000 nanometers) and are essentially filters, but not membranes, as in the present invention. The membranes of the present invention would have different properties and functions, compared to filters. For example, the membranes of the present invention can be used for direct contact membrane distillation (DCMD), which can have important applications, such as for water desalination. Furthermore, the carbon nanotube membranes of the present invention are important and provide performance advantages over the prior art, because 1) the present invention uses a corrosion resistant porous substrate (e.g., Hastelloy, as well as quartz, Ni, and others) for growing the CNTs, and 2) the openings of these porous substrates are in a low micrometer ranges (<1-10 um). This important range size of the porous substrate enabled the development in the present invention of membranes (versus filters with larger openings). Therefore, the present invention provides suitable alloy support to make robust membranes that do not rust or corrode, and are also flexible.

The present disclosure is aimed at the development of robust, functional CNTM membranes that can be utilized for separation or other applications. The CNT can be grown on metallic catalysts by a variety of methods. Table 1 provides a brief review of the CNTM preparation methods. Preparing CNTM involves three main stages: (1) pretreatment, to develop initial catalytic sites; (2) CNT growth, to grow CNT on the catalytic sites by decomposition of the carbon source using a chemical vapor deposition (CVD) process; and (3) posttreatment, for purification or alignment of the grown CNT. Different pretreatments (oxidation, acid pickling, etc.) can be used to form nanometer-sized catalyst sites on metal substrates. Different metals with or without a passivation layer and additional catalysts can be used to grow CNT, with a variety of gases as the carbon source. The gas composition in the CVD chamber and other process conditions (i.e., temperature, pressure, gas residence time, gas velocity, and flow patterns around the CNT deposition substrates) can influence length, diameter, surface coverage, uniformity, purity, and other properties of CNT.

Through a systematic study, we have identified an appropriate method for fabricating superhydrophobic and corrosion-resistant CNTM membranes. Suitable substrates with micrometer-sized pore openings, including, but not limited to, SS, Hastelloy C22 (HAST), silver, and quartz fiber filter, were selected as templates for CNT growth. The substrates were also chosen because of their high temperature and corrosion resistance, mechanical strength, and flexibility.

Dense CNT growth on SS and HAST (pretreated by air oxidation) and on nickel-sputtered silver (subjected to dewetting at higher temperature) was achieved by pyrolysis of acetylene and benzene at 750° C.

After initial characterizations, CNT on HAST (CNTH), because of its superior corrosion resistance, high flexibility, high CNT purity, and superhydrophobicity, was chosen as the best performing material for further analysis and testing when using a membrane distillation setup. The robustness of the developed CNTH membrane was demonstrated by the American Society for Testing and Materials (ASTM) adhesion test, ultrasonication in a solvent, and exposure to concentrated HCl and high-salinity water (a 70,000 ppm NaCl solution). Several reports suggest that CNT membranes, such as bucky paper (BP), might be promising materials for membrane distillation because of their superior hydrophobicity, antifouling property, and mechanical strength, but they suffer from delamination, low flux, and complicated fabrication requirements (References 29-32). We characterized the developed CNTH membranes by the ASTM standard bubble point test and direct contact membrane distillation (DCMD) and compared them with selected commercial membranes. The developed CNTH membranes were superhydrophobic and resistant to delamination and bending when compared with a commercial CNT BP membrane. The CNTH membranes showed promising performance in the membrane distillation tests for water desalination, suggesting these new CNT membranes have potential for use in separation applications, particularly in corrosive environments or at high temperatures.

Table 1. Brief summary of methods proposed in the literature for substrate pretreatment, CNT growth on metallic or ceramic substrates, and posttreatment of grown CNTs.

TABLE 1

| Method | Summary |
| --- | --- |
| Pretreatment | |
| Oxidation | Oxidation of substrate in air/$O_2$/humid air in the temperature range of 500-1000° C., followed by a reduction in $H_2$ or heat treatment in Ar, or both (References 11, 15, 16, and 33-35). |
| Acid treatment | Pickling in concentrated HCl for 5-20 min (References 33, 34, 36, and 37). |
| Abrasion | Abrasion of ceramic substrate with steel. Abrasion pressure influences CNT growth density (Reference 38). |
| Metal catalyst loading by physical vapor deposition | Metal catalyst deposition after depositing a buffer layer of $SiO_2/Al_2O_3/Al$ by E-beam evaporation/sputtering (References 12, 14, and 39-41). |
| Metal catalyst loading by electrochemical deposition | Electrophoretic deposition of cobalt (Reference 42). |
| Metal catalyst loading by dip coating | Applying an $FeCl_3$ solution on the target substrate by dipping (References 14 and 43). |
| CNT growth on substrates | |
| Stainless steel (SS) | Growth on SS (after pretreatment) when using $C_2H_2$ (12 μm SS fiber, 2 μm SS fiber, 50 μm SS grid and powder), $C_2H_2$ with $C_6H_6$ (23 μm SS wire), CO (SS wire), $C_2H_6$ (63 μm SS wire), or $C_2H_4$ (SS sheet) (References 4, 11 15, and 33-36). |
| Nickel (Ni) | Growth on Ni foil when using $CH_4$, or on a Ni TEM grid when using $C_2H_4$ (References 37 and 44). |
| Inorganics on metal mesh | Growth on $Al_2O_3/SiO_2$, after 1-2 nm Fe deposition, when using $C_2H_4$ (SS foil) or $C_2H_4$ with $H_2O$ (Si, metal foils) (References 9, 12, 14, 40, and 41). |
| Alloys | Growth on Permalloy, Invar plate (after pretreatment) when using $C_2H_4$ or Inconel substrate with Al and Fe layer when using $C_2H_4$ with $H_2O$ (References 9 and 16). |
| Postprocessing of CNT | |
| Steam treatment | Five-minute treatment at 800° C. after the growth stage to remove amorphous carbon layer (Reference 39). |
| Oxidation | Oxidation at 400° C. to remove amorphous carbon layer (Reference 42). |
| Capillary densification | Densification of CNT when using condensation of acetone vapor on them (Reference 45). |

A systematic approach has been undertaken to develop new types of CNT membranes grown on various substrates for membrane distillation or other separation applications. The developed membranes ideally have submicrometer openings and are flexible, nonfragile, superhydrophobic, resistant to delamination, resistant to corrosive conditions, and stable at high temperatures (e.g., up to 500° C.) under oxidative conditions. The experimental results presented here describe the preparation and characterization of different CNTM materials leading to the development of a CNT membrane (i.e., CNTH membrane) with the desired characteristics.

To develop CNTM membranes, it is imperative to obtain uniform and dense coverage of CNT on the substrate. We began with various methods proposed for CNT growth on metallic substrates (Table 1) and modified them to prepare membranes with the desired properties. Summaries of different synthesis methods, including different pretreatments and CNT growth scenarios, along with optical and scanning electron microscope (SEM) images of selected prepared samples under each experimental condition.

Figure 9:
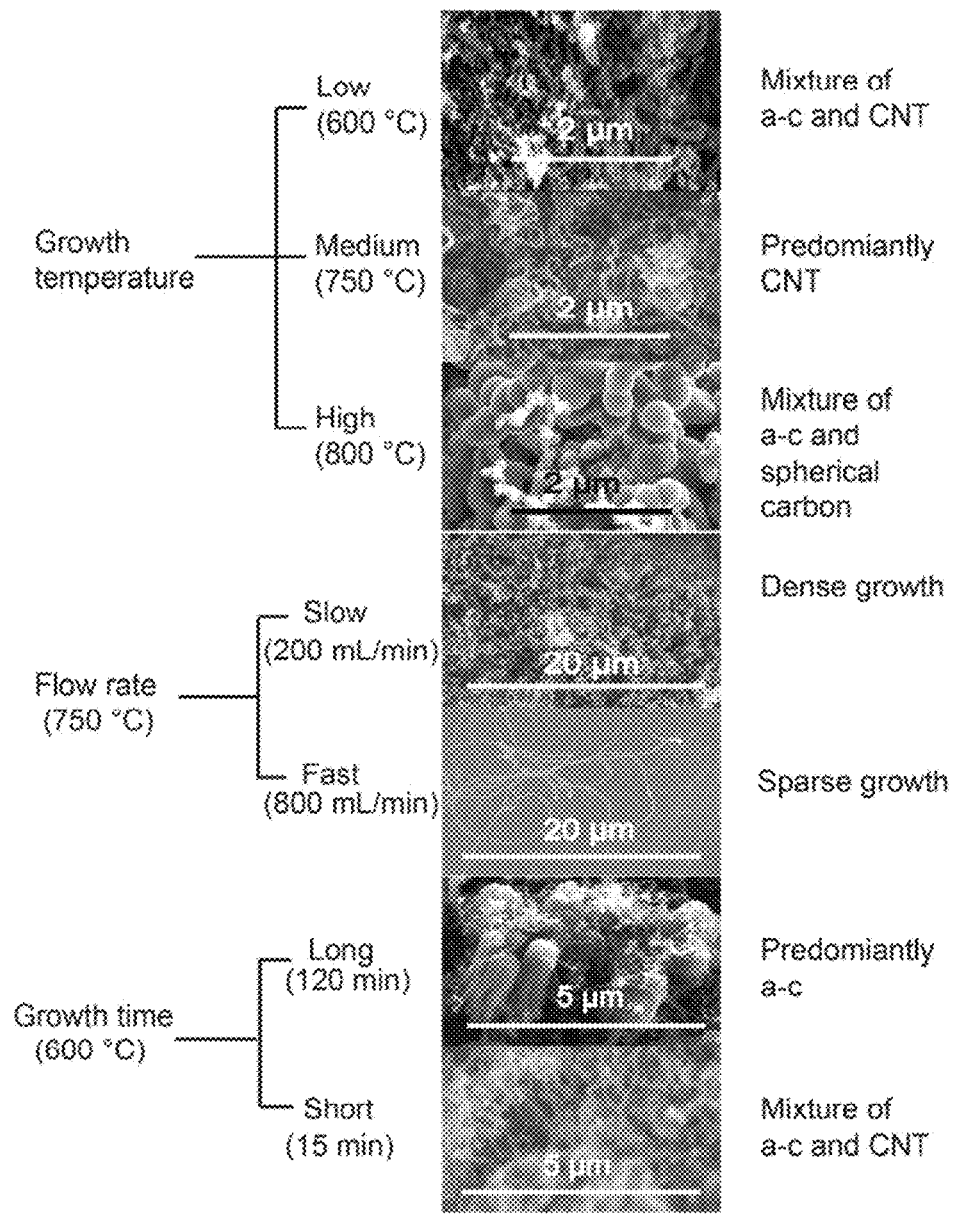
FIG. 9 shows the effect of variations in the growth parameters on CNT growth on stainless steel substrates. a-c (amorphous carbon).

For metal and alloy substrates, air oxidation followed by hydrogen reduction (ox-red) or catalyst deposition by physical vapor deposition (sputtering) were the only pretreatments that resulted in dense growth of CNT. Dip coating was also identified as an effective pretreatment method for the tissue quartz fiber substrate. Contrary to the SS substrate, the HAST substrate showed minimal coverage of CNT without any pretreatment (FIG. 12). Dense growth of CNT on the HAST substrate has previously been shown with hot filament plasma-enhanced CVD, in which plasma helps to break up the substrate surface to smaller catalyst sites. Here, we used a hot-wall atmospheric pressure CVD with ox-red or sputtering pretreatment conditions to generate catalyst sites similar to those generated in the plasma-enhanced CVD system to grow dense CNT networks on the HAST substrate (Reference 46). FIG. 1A shows SEM images of the CNTH-750 membrane (CNTH prepared at a growth temperature of 750° C.) with the ox-red pretreatment. The ox-red pretreatment helped break up the smooth surface layer to generate a rough surface with nanometer-sized catalyst sites (Reference 15). Dense growth of CNT was observed at those catalyst sites around individual HAST wires (FIG. 1A). The CNT were not aligned along any particular direction as they grew around wires with circular cross-sections. It was expected that during CNT growth on the alloy mesh substrate, amorphous carbon would also form simultaneously because of the availability of carbon atoms, which might form graphitic or nongraphitic carbon structures (Reference 47). To reduce the formation of amorphous carbon and prevent coverage of the catalytic sites with these impurities, water vapor was used during the growth stage at 750° C. to etch away the amorphous carbon through a gasification reaction (Reference 14). Compared with amorphous carbon, different forms of graphitic carbon, including CNT, are significantly more resistant to reaction with water at elevated temperatures (Reference 14). As shown in FIG. 1A, the presence of amorphous carbon was minimal; amorphous carbon appears brighter in the SEM images because it is less electrically conductive than CNT or graphitic carbon. When CVD was performed at a lower temperature (600° C.), the CNTM had a substantial amount of amorphous carbon impurities (FIG. 9). The balance between catalytic CNT formation and amorphous carbon deposition shifted toward more amorphous carbon deposition when the growth temperature was 800° C. (FIG. 9). This result is consistent with the results of Romero and co-workers and is mainly due to rapid decomposition of the hydrocarbon source (acetylene and benzene) at 800° C. (Reference 47). Therefore, a CNT growth temperature of 750° C. was identified as the optimal temperature for CNTH preparation.

Figure 15A:
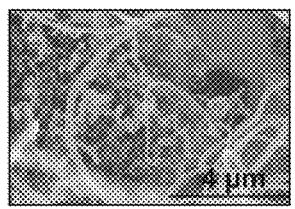
FIG. 15A, FIG. 15B, and FIG. 15C show carbon nanotube growth on a nickel-sputtered silver membrane. The sample was prepared at 750° C.
Figure 15B:
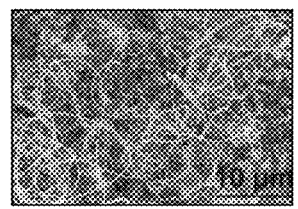
Figure 15C:
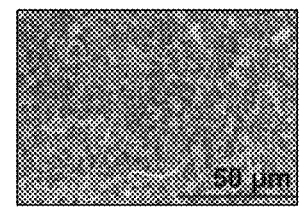
Figure 16A:
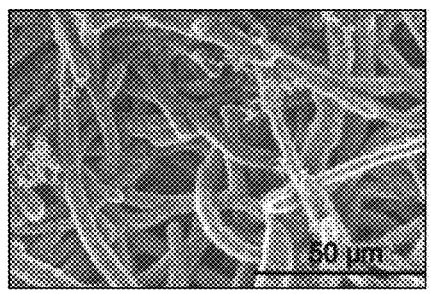
FIG. 16A, FIG. 16B, FIG. 16C, FIG. 16D, FIG. 16E, and FIG. 16F show the effect of single dipping in a $NiNO_3$ catalyst solution and growth at 600° C.
Figure 16B:
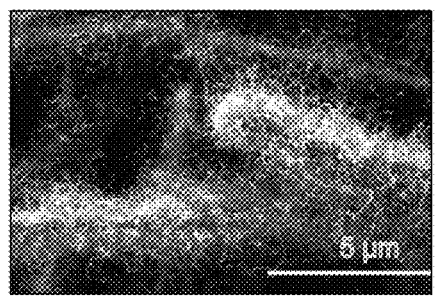
Figure 16C:
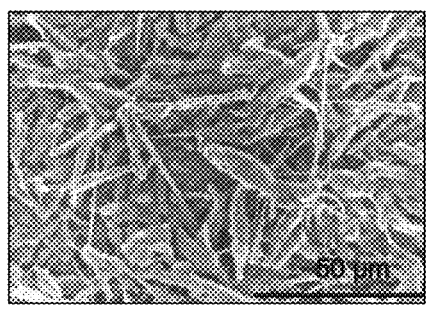
Figure 16D:
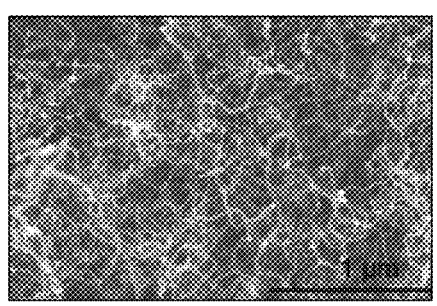
Figure 16E:
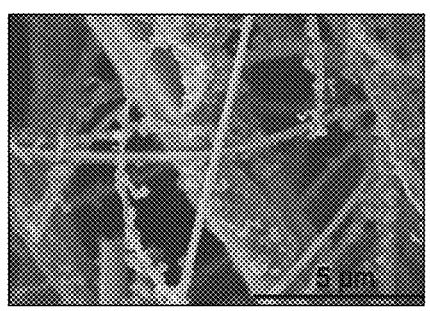
Figure 16F:
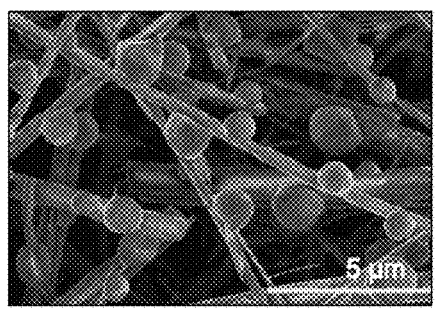

Similar results of dense CNT growth at 750° C. were obtained when the HAST mesh was coated with an additional nickel layer (around 600 nm) by sputtering as a pretreatment step (FIG. 1B). At this temperature, the thin sputtered nickel layer dewets and forms nanometer-sized nickel catalysts, facilitating the initial formation of CNT bases and the subsequent growth of CNT (Reference 48). Other pretreatments, including acid pickling or electroless nickel deposition and Argon plasma bombardment (FIG. 14), resulted in poor growth of CNT because of the inability of the pretreatment to produce suitable catalytic sites. Among the other substrates, a dense CNT network was grown on nickel-sputtered silver when sputtering nickel was used as a pretreatment step (FIG. 15). However, for tissue quartz fiber (a nonmetallic substrate) dipped in the metal catalyst solution or sputtered with nickel, the best temperature for CNT growth was 600° C. instead of 750° C. (FIG. 16). We also prepared CNTH samples following the methods of Pattinson and co-workers and Vander Wal and Hall and compared them with a CNTH sample prepared based on our method. Samples prepared based on our method have a similar or better CNT network and appear to be free of amorphous carbon impurities (FIG. 17) (References 11 and 15).

All four prepared CNTM membranes, namely, CNT on SS (CNTSS), CNTH, CNT on silver (CNTS), and CNT on tissue quartz fiber (CNTQ), were hydrophobic (FIG. 8) but had varying degrees of flexibility and corrosion resistance. The CNTSS corroded with prolonged (2-day) exposure to deionized water. The corrosion in SS occurred because of depletion of the protective chromium layer during the CVD stage (Reference 49). The CNTQ and CNTS membranes became brittle in the CVD stage and broke during testing with the membrane distillation setup (FIG. 18C). The CNTH-750 membrane showed superior corrosion resistance, hydrophobicity, and mechanical strength and flexibility, as discussed in detail later. Therefore, only CNTH-750 was considered for further material characterization and membrane testing.

Wettability of the CNTH-750 membrane at the macro- and microscale was studied by using a goniometer and environmental SEM (E-SEM; FIG. 2). For macroscopic measurements, the goniometer measurement inside a class 100 cleanroom could not produce water contact angle values for CNTH-750. The 4 µL water droplet did not adhere to the sample (FIG. 2A). The hydrophobicity of the developed CNTH-750 membrane was compared with that of a conventional CNT BP, and both materials showed similar hydrophobic properties as the water droplet was pinned and stretched during retraction of the pipette (FIG. 2A). When water was ejected toward the CNTH-750 from a syringe, droplets bounced and rolled off the surface, again confirming the superhydrophobic property of the CNTH-750 membrane. At a microscopic scale, however, it was possible to form water droplets by condensation. Environmental SEM images show the formation of spherical droplets on the CNTH-750 membrane, demonstrating the superhydrophobic property of this membrane (FIG. 2). Using Image J software, we measured the water contact angle of the droplets in the E-SEM image as 163 degrees.

The graphitic nature, defects, and CNT structure of CNTH membranes were investigated by using Raman spectroscopy and transmission electron microscopy (TEM). FIG. 3A illustrates the Raman spectra obtained from CNTH membranes prepared at 600° C. (CNTH-600) and 750° C. (CNTH-750). The distinct peak at ~1600 cm$^{-1}$ indicates that the form of carbon deposited on the membranes is predominantly graphitic carbon (Reference 50). The distinct shape of this peak also indicates minimal oxidation of the CNT (Reference 51). FIG. 3A reveals another peak around 1300 cm$^{-1}$ (D band). This band originates from a hybridized vibrational mode that is usually associated with graphene edges, and it reveals the presence of defects on the graphene structure. This defect can lead to the incorporation of functional groups at those sites. Functional group analysis on the surface of CNTH-750 materials was performed by X-ray photoelectron spectroscopy (XPS) and is discussed later in this section. A significant 2D or G' peak (band at 2700 cm$^{-1}$) was observed only when the growth took place at 750° C. The intensity ratio between D and G ($I_D/I_G$) and 2D and G ($I_{2D}/I_G$) can indicate the density of functional groups on the surface (Reference 52). The intensity ratios for our samples indicate the samples are not oxidized significantly (as in the case of $HNO_3$ oxidation of CNT), but they are also not free of surface functional groups (as with samples annealed to 2500° C.) (Reference 52).

Figure 3B:
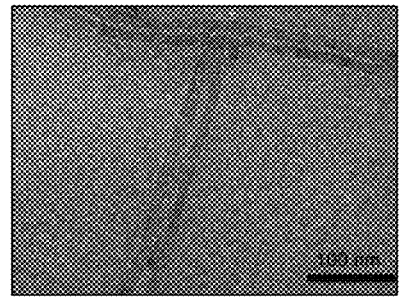

FIG. 3B shows the TEM image of CNT from CNTH-750, in which a multiwalled CNT can be observed that has a structure similar to a commercial CNT, with a hollow inner core and multiwalled outer shell (FIG. 19). The diameter of the CNT from CNTH-750 is between 25 and 50 nm, based on the analysis of several data points (FIG. 19), and the outside wall of the CNT in the CNTH-750 sample appears to be smooth and free of amorphous carbon deposition (FIG. 3B).

Figure 4A:
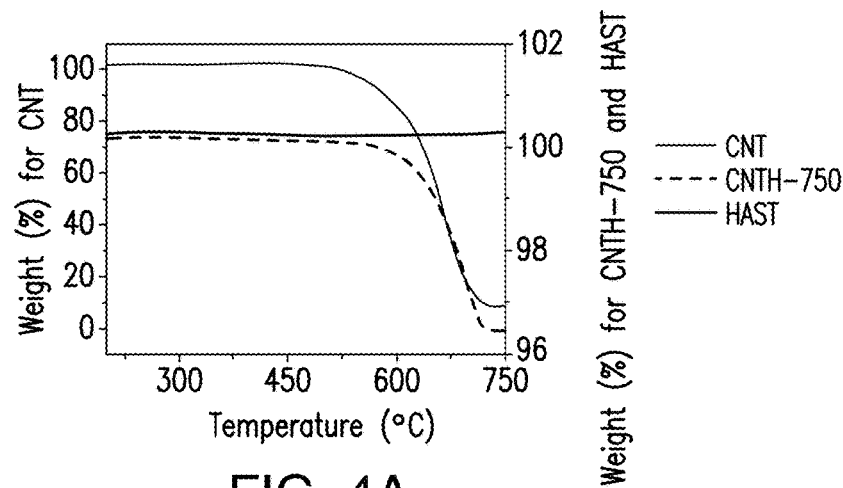
FIG. 4A and FIG. 4B show thermogravimetric analysis results and nitrogen isotherms.
Figure 4B:
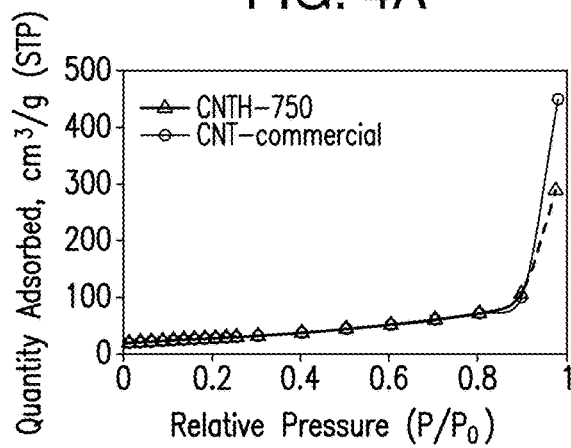

To further characterize the developed CNTH-750 membrane, BP was also characterized as a baseline carbon membrane material for comparison. Thermogravimetric analysis and surface area measurements were used to compare the properties of our developed CNTH-750 membrane with the commercial CNT sample used to produce the BP material. The thermogravimetric analysis data of CNTH-750 were similar to those for the commercial CNT and showed that the sample was stable in air up to 500° C. (FIG. 4A). Brauner-Emmett-Teller surface area results, estimated from nitrogen isotherms at 77 K, for the tested CNT and CNTH-750 materials were similar (98.9 m$^2$/g for the CNT vs. 101.6 m$^2$/g for CNTH-750; FIG. 4B). Thus, the surface area analysis also showed similarity between the commercial CNT and the CNT grown on the CNTH-750.

The as-received HAST mesh was also tested by thermogravimetric analysis to examine possible changes during oxidation pretreatment of the substrate in the membrane synthesis process. Results indicate a slight weight increase of the HAST substrate resulting from minor surface oxidation. Oxidized metals during the oxidation pretreatment stage were reduced in the next reduction pretreatment stage to provide active sites for growth of CNT on the CNTH membrane.

Figures 5A, 5B:
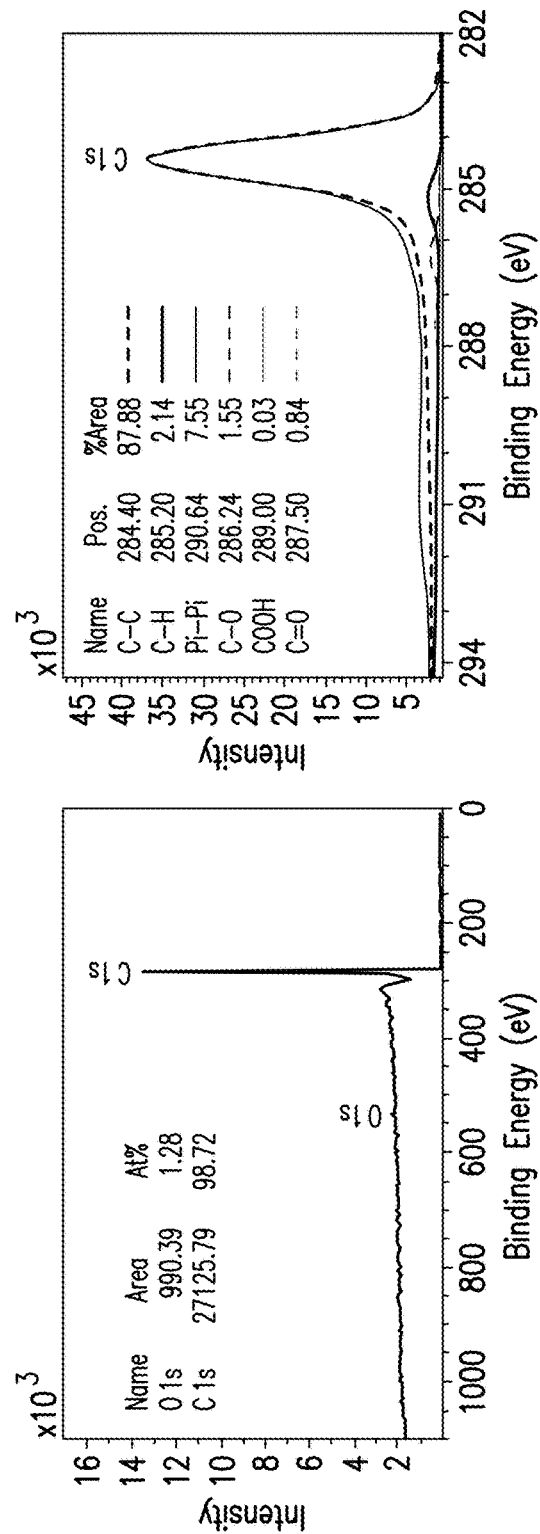
FIG. 5A and FIG. 5B show X-ray photoelectron spectroscopy (XPS) spectra. XPS spectra of the CNTH-750 membrane.

Surface functionalities associated with the CNTH-750 surface were further investigated by XPS to shed more light on their contribution to surface wettability (FIG. 5). According to the XPS scan of the CNTH-750, the amount of surface oxygen is only 1.28%, and the other element detected by XPS is carbon. This result appears quite similar to the XPS spectra of pristine multiwall CNT reported in the literature (Reference 53). The surface concentration of oxidized hydrophilic CNT can be as high as 15% to 20% (Reference 54). Therefore, the detected oxygen content of the CNTH-750 sample (i.e., 1.28%) was low and was not expected to contribute substantially to surface hydrophilicity. Curve fitting of the C 1s high-resolution spectrum (FIG. 5) revealed the presence of hydrophobic CH groups that might contribute to the overall hydrophobicity of the material. Therefore, the CNTH-750 membrane has a unique topographic structure, and the presence of CH-containing groups may contribute to its superhydrophobic behavior (Reference 55).

Figure 6A:
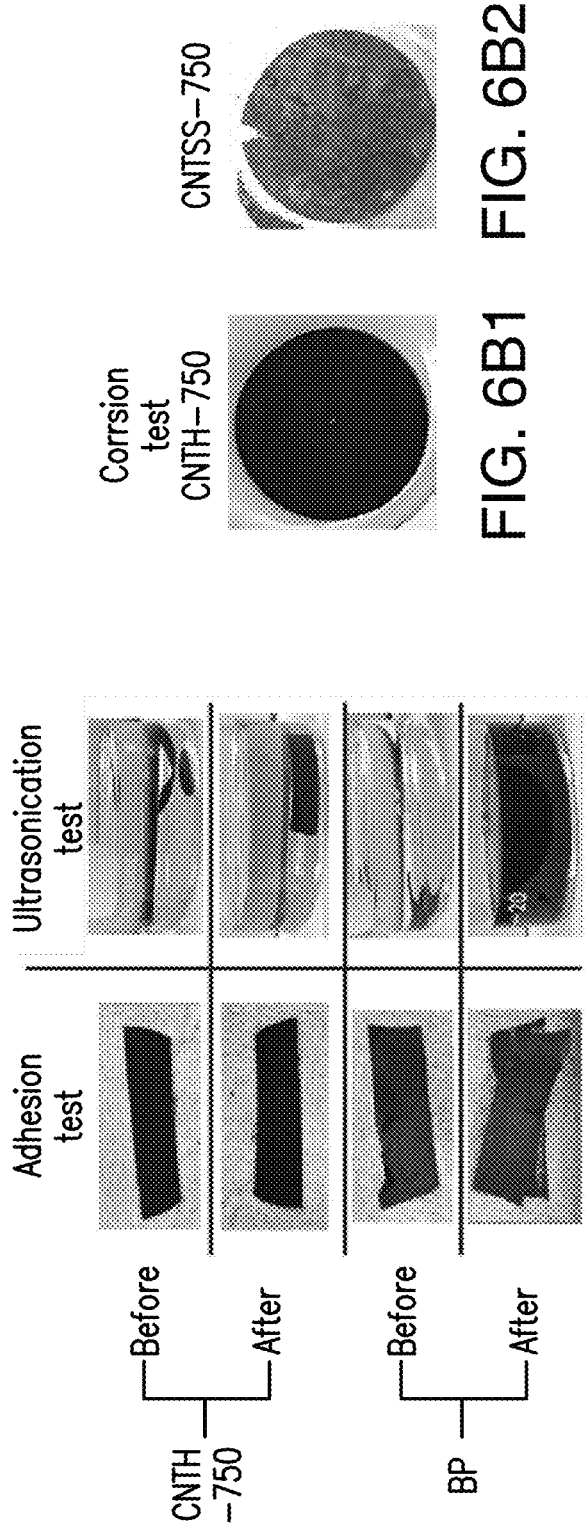

Interfacial bonding and resistance to harsh environments for the CNTH-750 membrane were investigated to show its robustness and usefulness for practical applications (FIG. 6). The ASTM adhesion test was used to test both the CNTH-750 membrane and, as a reference, BP (FIG. 6A) (Reference 56). When adhesive tape was peeled from the CNTH-750 membrane surface, a uniform layer was removed. However, after this layer was peeled away, the CNTH-750 membrane was still covered with a black film (i.e., CNT) and no bare metal substrate was observed. In contrast, for BP, the sample was torn apart because of delamination of the CNT network. The CNTH-750 membrane also showed resistance to ultrasonication for 40 seconds at a frequency of 20 KHz and an input energy of 240 W/L in isopropyl alcohol (FIG. 6A). The BP sample disintegrated when sonicated under the same conditions, whereas the CNTH-750 sample remained intact, with a small amount of CNT released in the isopropyl alcohol solvent (FIG. 6A). For the developed CNTH-750 membrane, both the adhesive and sonication tests demonstrated the superior interfacial bonding of CNT with the substrate, stronger entanglement of the grown CNT network, or both. Furthermore, the CNTH-750 membrane showed a higher mechanical strength, compared with the BP membrane, during the membrane distillation tests (FIG. 20).

FIG. 6B shows the corrosion resistance of CNTH-750 samples after exposure to concentrated (37%) HCl for 30 min and high-salinity water (a 70,000 mg/L NaCl solution) for 24 h. After 1 day, CNTH-750 did not show any signs of corrosion, whereas CNTSS-750 corroded even with exposure to deionized water. Therefore, CNTH-750 showed excellent resistance to harsh media, which is important for challenging applications in water desalination, heat transfer, water harvesting, and other separation applications (References 57 and 58).

Figure 21:
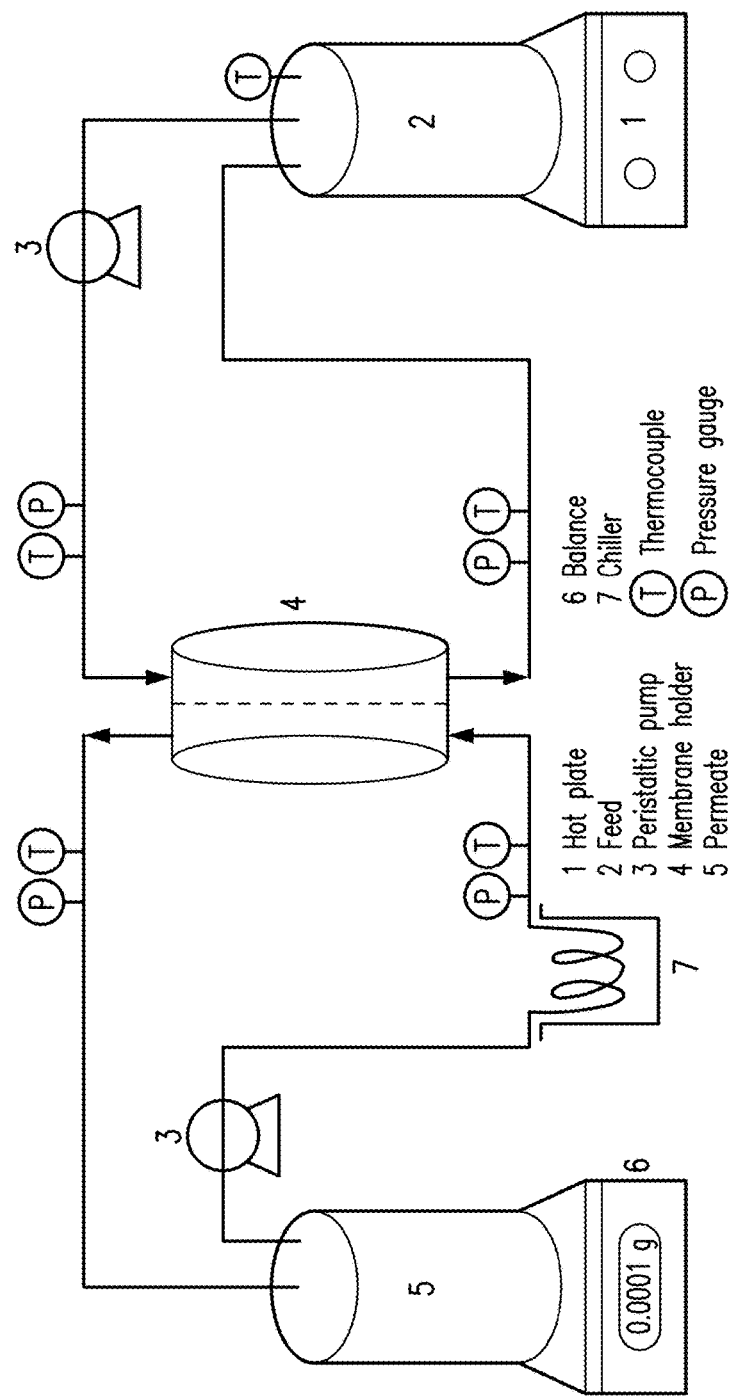
FIG. 21 shows a schematic diagram of the experimental setup used for the DCMD experiments.

Finally, we demonstrated one of the potential applications of the developed CNTH-750 membrane by performing water desalination experiments by DCMD. Selected polymeric (TF-200, a Teflon material) and carbon (BP) membranes that have been used by other researchers for the DCMD were also tested for comparison (References 17 and 32). A schematic diagram of the DCMD setup is shown in FIG. 21. Membranes were characterized by the ASTM standard bubble point test[59] to qualitatively evaluate and compare their pore openings. The CNTH-750 membrane had the smallest bubble point pressure (12.5±0.15 psi), followed by BP (14.23±0.15 psi) and TF-200 (16.43±0.15 psi), indicating an order of CNTH-750>BP>TF-200 in pore size opening. These membranes also had different thicknesses: 70, 110, and 340 µm for BP, TF-200, and CNTH-750, respectively. Larger pores contributed to higher water vapor flux values, whereas water flux was inversely proportional to the membrane thickness or diffusion length based on Fick's law of diffusion.

Figures 7A, 7B, 7C:
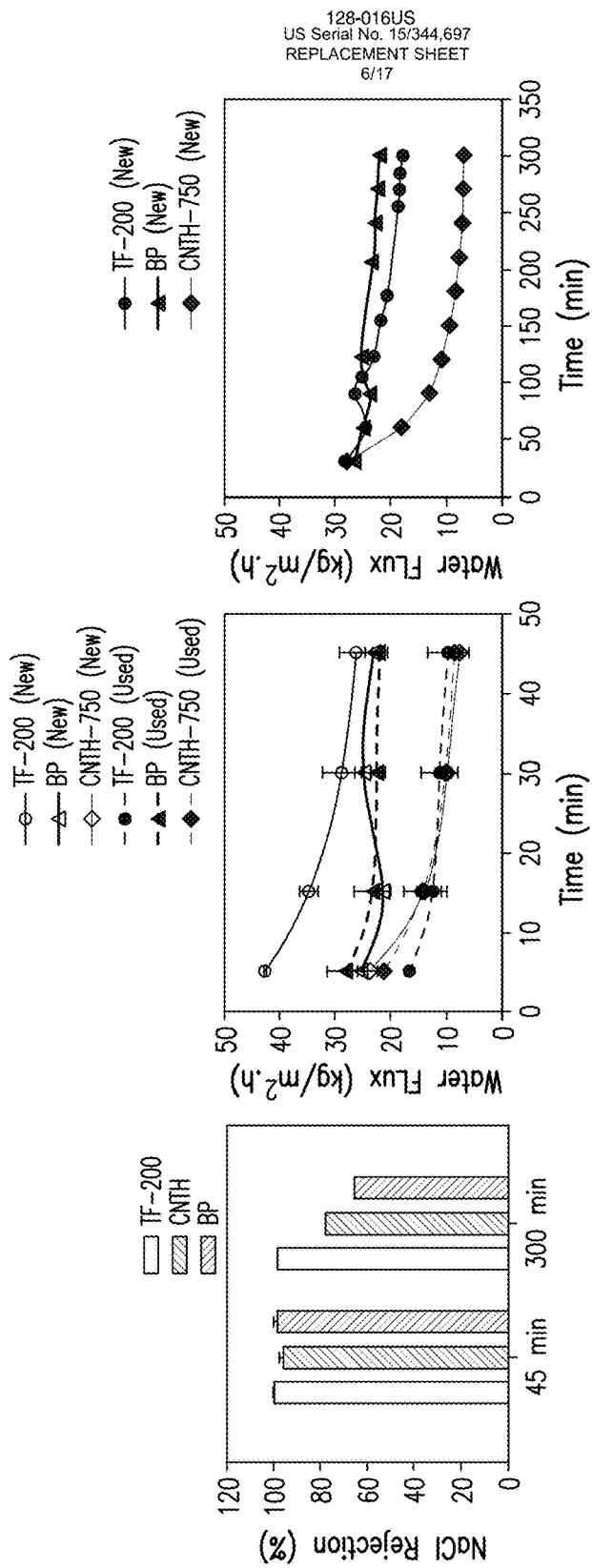
FIG. 7A, FIG. 7B, and FIG. 7C depict data for direct-contact membrane distillation. Performance of the developed CNTH-750 membrane for water desalination by direct-contact membrane distillation (10,000 mg/L NaCl solution with a feed and permeate temperatures of 80 and 5° C.) in comparison with conventional polymeric (TF-200) and carbon (BP) membranes.

The performance of the developed CNTH-750 membrane for desalination of a 10,000 mg/L NaCl solution by DCMD was evaluated and compared with the performance of TF-200 and BP membranes under the same conditions (FIG. 7). All tested membranes exhibited more than 95% salt rejection during testing for a short duration (FIG. 7A). Salt rejection of BP and CNTH-750 declined to ~89% and ~82%, respectively, after 2 h operation. However, salt rejection performance of both CNT-based membranes (BP and CNTH-750) declined significantly (~65% for BP and ~75% for CNTH-750) during 5 h test (FIG. 7A). The decline in salt rejection might be from changes in the membrane wetting due to longer term operation.

The TF-200 membrane showed consistently higher performance compared with the CNTH-750 and BP membranes during the first test (FIG. 7B). Nevertheless, additional tests of the used TF-200 membrane resulted in a reduction of the water vapor flux, whereas performance of the CNTH-750 and BP membranes remained the same. These tests highlight the sensitivity of the TF-200 polymeric membrane to the elevated temperature and temperature variation (cooling and heating cycles during multiple runs), compared with the more stable performance of both tested carbon nanotube membranes. The flux performances of all three membranes during 5 h test were compared in FIG. 7C. BP and TF-200 show consistent flux between 20-30 Kg/m$^2$·h. On the contrary, CNTH-750 flux declines with time reaching a consistent value of ~10 Kg/m$^2$·h after 2 h. Although CNTH-750 performs well during short term multicycle test, flux becomes less than 10 Kg/m$^2$·h when the test duration is longer than an hour (FIG. 7B and FIG. 7C). More investigation is required to find the change in CNTH-750 pore structure or wettability during long term tests, which may be responsible for this decline.

The three tested membranes had different thicknesses. A cross-sectional SEM image of fabricated CNTH-750 and estimation of CNT-bundle thickness from SEM image are presented in FIG. 22 and FIG. 23 respectively. From commercial membrane specifications and measurements of CNTH-750, BP and CNTH-750 membranes were 0.6 and 1.5 times thicker than TF-200 (i.e., ratio of the thickness of BP (70 µm) or CNTH-750 (163 µm) to the thickness of TF-200 (110 µm), respectively). Therefore, mass transfer resistance of CNTH-750 is ~1.5 times higher than TF-200. However, the heat transfer resistance of MWCNT BP is three times smaller than Teflon (References 63 and 64). Water flux is mainly a function of combined heat and mass transfer phenomena across the membrane that may depend on material characteristics and operation specifications and conditions. Also, as stated above, FIG. 24 is a graphical abstract showing flexibility, hydrophobicity, and corrosion resistance of the CNTH-750 membrane.

Unlike polymeric membranes, BP and the developed CNTH-750 membrane showed consistent performance during two testing cycles (FIG. 7B) and could tolerate higher temperature conditions. The CNT membranes appear to be promising materials for application in high-temperature membrane distillation, leading to a significant enhancement of water flux. Singh and Sirkar (Reference 61) have shown that the permeate flux of a DCMD system can be tripled if the feed temperature is increased from the conventional membrane distillation temperature of 70° C. to 130° C. High-temperature DCMD might be also considered to recover and purify high-boiling point solvents.

The developed CNTH-750 membrane is expected to have the antifouling and antibacterial characteristics of CNT materials while having the unique properties of mechanical robustness and flexibility, compared with conventional BP membranes (Reference 28, 29, and 62).

An important advantage of the CNTH-750 membranes is their high interfacial bonding to the solid network of support material and their resistance to delamination, as discussed and demonstrated here (FIG. 6A). For the DCMD tests, we have observed that after completing the desalination tests and upon opening the membrane holder, the BP samples are torn apart, whereas the CNTH-750 membrane remains intact.

As previously discussed, CNTH-750 membranes are resistant to air oxidation up to 500° C. and can tolerate a harsh concentrated acid treatment. These unique properties can be used to regenerate membranes that are fouled with organic or inorganic contaminants after extensive use. Organic foulants (e.g., natural organic matter or oil and grease) can easily be burned off by heating the membranes in air, whereas inorganic foulants (e.g., precipitated calcium and magnesium scales) can be washed away by immersing the membranes in an acid bath. This research may lead to the development of a new generation of regenerable and reusable membranes.

New types of CNT membranes, grown on various substrates, have been prepared by using a systematic approach. Robust CNT membranes have been developed with a CVD method by direct growth of CNT on a Hastelloy-C alloy with micrometer-sized openings. The CNT membranes grown on HAST at 750° C. (CNTH-750) by CVD using a gas mixture of $C_2H_2$, $C_6H_6$, $H_2$, $H_2O$, and Ar, after an initial ox-red pretreatment, have the most desirable properties among all the prepared membranes. The developed CNTH-750 membranes have pore openings of 50 to 500 nm and are superhydrophobic, flexible, resistant to air oxidation up to 500° C., and resistant to concentrated acid and salt solutions. Unlike conventional CNT BP, the developed CNTH-750 membranes are resistant to delamination and have demonstrated a high interfacial bonding of the grown CNT with the alloy substrate, as confirmed by adhesion and ultrasonication tests. Tests of water desalination by membrane distillation reveal that CNTH-750 has a high (>97%) salt rejection performance, similar to the baseline polymeric (TF-200) or carbon BP membrane but exhibits higher normalized water flux values and superior performance during multicycle tests. These robust carbon membranes are reusable and are expected to be less susceptible to fouling because of their superhydrophobic properties. Furthermore, if fouled by organic or inorganic species, they can potentially be regenerated by heating in air or washing in acid. The developed CNT membranes may have other uses in various separation, heat transfer, energy harvesting, and sensing applications (References 7 and 8). These membranes demonstrate great promise for separation applications, particularly under high-temperature conditions and in corrosive environments.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

Materials and Methods

Materials. The SS mesh (325×2300 Micronic 316 L) was obtained from TWP Inc. (Berkeley, Calif.) as 1 in. discs with a 2 µm pore size. The HAST mesh was purchased from Unique Wire Weaving Inc. (Hillside, N.J.) as 1 in. discs with a 10 µm opening. Pure silver membranes (99.97%) with a 0.2 µm particle retention rating were obtained from Sterlitech Corporation (Kent, Wash.). Poly(tetrafluoroethylene) (PTFE) membranes with a 0.2 µm pore size were obtained from Pall Corporation (New York City, N.Y.). The BP and CNT were purchased from NanoTech Labs, Inc. (Yadkinville, N.C.). The tissue quartz filters with a 432 nm pore size and 1 in. diameter were obtained from SKC Inc. (Eighty Four, Pa.). The electroless ammonia-type nickel solution was purchased from Transcene (Danvers, Mass.). The CVD gases (argon, hydrogen, methane, and acetylene) were acquired from S.J. Smith Co. (Urbana, Ill.). Other materials used, including benzene, ferric chloride, nickel nitrate, concentrated HCl, isopropyl alcohol, and NaCl were ACS grade and obtained from Fisher Scientific (Waltham, Mass.).

Preparation of Carbon Membranes. Different pretreatment, growth, and posttreatment methods from the literature were evaluated and optimized by performing experiments in our laboratory. A modified method was developed based on these experimental observations that could allow CNT growth at a higher density and with fewer amorphous carbon impurities. The methods had some variations, depending on the pretreatment conditions (oxidation at 750° C. followed by reduction under hydrogen/acid pickling in a concentrated HCl/metal catalyst loading by sputtering or dip coating, followed by dewetting). After the initial pretreatments, the samples were placed in a quartz tube (a 25 mm diameter quartz tube having a quartz frit fused in the middle) inside a tube furnace (Lindberg/MPH, Riverside, Mich.) for CNT growth on the substrate by CVD. During the growth stage, 12.5 standard cubic centimeters per minute (SCCM) of acetylene, 50 SCCM of hydrogen, and 125 SCCM of argon were bubbled in water (at 20° C.) to add water vapor. The combined flow was bubbled through benzene (at 20° C.) and then sent to the growth chamber. The CVD was performed for 15 to 30 min at 600 to 800° C. Samples were cooled either under argon or under a combination of argon and water vapor. The CNTM membranes prepared included CNTSS, CNTH, CNTS, and CNTQ.

Characterization. The prepared membranes were characterized to obtain several key parameters. The SEM images were obtained using Philips XL30 ESEM-FEG (FEI, Hillsboro, Oreg.) and Hitachi 54800 (Troy, Mich.) instruments. The E-SEM images were obtained at a 4° C. sample temperature and 100% relative humidity using an FEI Quanta 450 instrument (FEI, Hillsboro, Oreg.). The water contact angle (WCA) was measured from the E-SEM images by using ImageJ software with a drop-analysis plugin based on fitting the Young-Laplace equation to the image data. Raman microscopy was performed with a Renishaw microPL/Raman microscope (Renishaw Inc., Gloucestershire, UK). The macroscopic WCA of samples were measured with a KSV CAM200 goniometer (KSV Instruments Ltd., Helsinki, Finland). An XPS analysis of the samples was performed with a Kratos Axis ULTRA instrument (Kratos Analytical Ltd., Manchester, UK) equipped with a monochromatic magnesium or aluminum $K\alpha$ X-ray source and a $0.7 \times 0.3$ mm$^2$ slit for the collection of emitted photoelectrons. Calibration was performed according to the carbon peak at 284.5 eV binding energy, and carbon and oxygen compositions were calculated from their high-resolution spectra (analyzed with CasaXPS software, Casa Software Ltd., Teignmouth, UK) with relative sensitivity factors for carbon and oxygen of 0.278 and 0.711, respectively. Binding energies for the functional groups used in high-resolution XPS spectra curve fitting were selected by using the methodology mentioned in our earlier work (Reference 60). Surface areas of selected samples were determined from adsorption isotherms of nitrogen from a relative pressure ($P/P_0$) of $10^{-3}$ to 1 at 77 K by using a Micromeritics Gemini VII instrument. Samples were degassed in a vacuum for 1 h at 180° C. before nitrogen adsorption. Surface area was estimated from the linear range of the Brauner-Emmett-Teller equation from the relative pressure of 0.05 to 0.2. The thermal and oxidation stability values of samples were characterized by using a thermogravimetric analyzer (model VersaTherm HS, Thermo Fisher, Waltham, Mass.) by measuring the weight of samples heated with a heating rate of 5° C./min to 750° C. in air. An ASTM bubble point test was performed by using a membrane holder, one end of which was connected to the nitrogen tank with a digital pressure gauge to monitor the increase in pressure, and with the other end connected to a clear glass tube having isopropyl alcohol in contact with the membrane to observe the emergence of nitrogen bubbles from the membrane under pressure (Reference 59). An ASTM adhesion test was performed by firmly attaching (air bubbles were removed by pressing) adhesive Scotch tape to the sample surface and checking the same surface after peeling the tape off (Reference 56). Ultrasonication tests were conducted for 40 s at a frequency of 20 KHz and an input energy of 240 W/L by using F550 sonic dismembrator equipment from Fisher Scientific (Hampton, N.H.).

Membrane Distillation Experiments. The selected developed membranes, BP, and TF-200 were tested by using a direct contact membrane distillation system. A 10,000 mg/L NaCl solution at 80° C. and deionized water at 5° C. were used as feed and permeate streams. The desalination performance of the tested membranes was evaluated by measuring salt rejection and water flux values. Further description of the DCMD system, experimental method, and related calculations is provided in the references cited throughout.

Preparation

Figure 8:
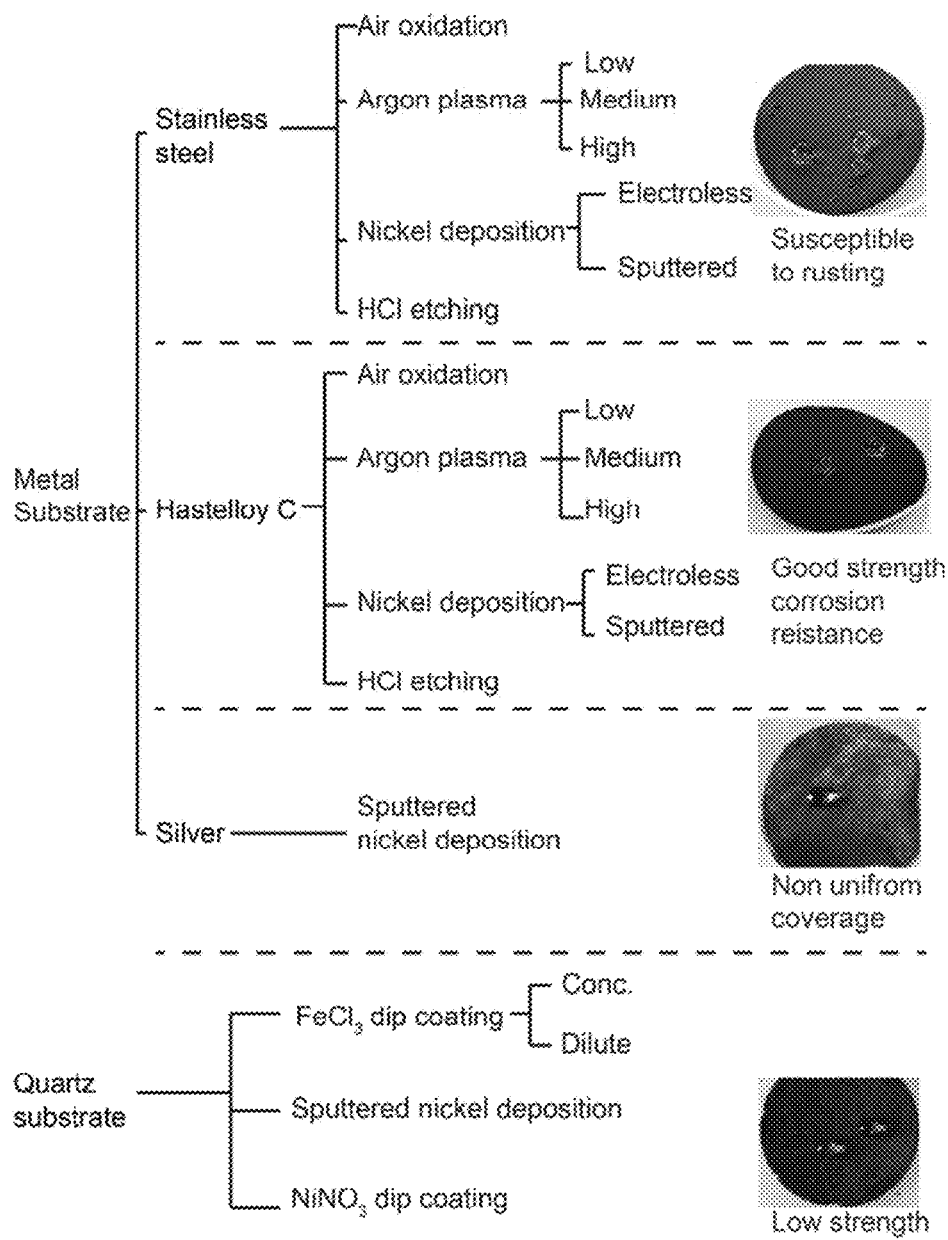
FIG. 8 shows various pretreatments used for different metal and quartz substrates before the CNT growth stage. Selected images (four images total) of the prepared CNT membranes show the physical appearance of these membranes and their hydrophobic characteristics. The four images from top to bottom show and are labeled: "Susceptible to rusting", "Good strength corrosion resistance", "Non uniform coverage", and "Low strength", respectively.

FIG. 8 illustrates different pretreatments applied to various substrates for carbon nanotube (CNT) growth. Selected photographs of the CNT membranes are included in FIG. 8 to show the physical appearance of these membranes and qualitatively show their water hydrophobicity by the spherical shape of the water droplets on their surface. FIG. 9 shows the effect of different growth variables of chemical vapor deposition (CVD), namely, growth temperature, time, and gas flow rate, on CNT growth on metal substrates. A schematic diagram of the sample preparation conditions and a photograph of the CVD setup are shown in FIG. 10. Further details on the sample preparation are provided below.

Pretreatment. Substrates were pretreated before the CNT growth stage by the following methods:

1. Dipping in 37% HCl for 10 to 20 min. This treatment is also referred to as "pickling" or dipping in a "strike solution."
2. Dipping in an electroless nickel solution for 6 to 14 h at 90° C. This step was followed by annealing at temperatures equal to or higher than 400° C. Electroless nickel plating is an autocatalytic chemical technique that uses a redox reaction to deposit metal species (such as nickel-phosphorus or nickel-boron compounds) on an object without the passage of an electric current.
3. Treating with argon plasma at high power and increasingly longer times (300 W for 5, 10, and 30 min) or low power and a shorter time (30 W for 1 min).
4. Sputtering nickel to an approximate thickness of 10 or 50 nm.

Additionally, the substrates were cleaned by degreasing with acetone, isopropyl alcohol, and deionized water.

Figure 10B:
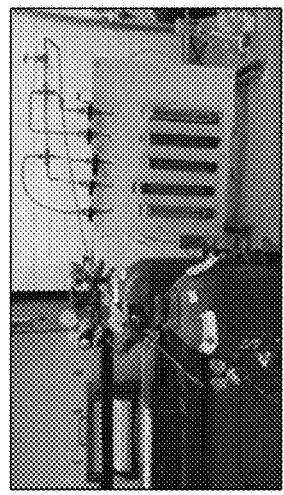
FIG. 10B is an image of the chemical vapor deposition (CVD) setup.
Figure 10A:
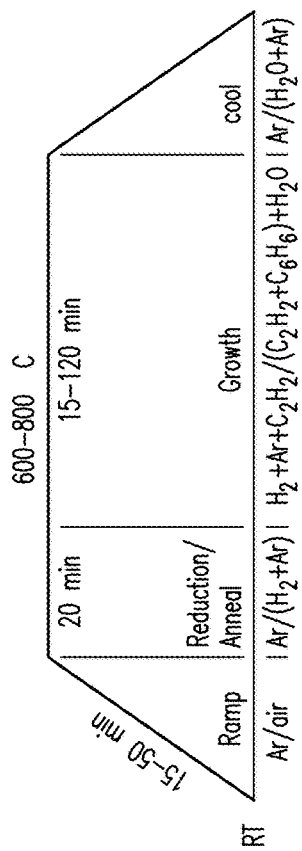
FIG. 10A shows a schematic diagram of the CNT growth process conditions.

Growth. The schematic diagram in FIG. 10A summarizes the range of different variables in the growth of CNT on pretreated substrates. FIG. 10B is a photograph of the CVD setup.

The pretreated substrate was placed inside a quartz tube [tube diameter of 26 mm for medium-temperature (750° C.) and high-temperature (800° C.) growth, and 2.5 in. for low-temperature (600° C.) growth]. The substrates were supported by large stainless steel discs or wound wires (to prevent the mesh from bending because of the thermal stress). The chamber was first purged with 1000 standard cubic centimeters per minute of ultra high purity argon. The second step involved gradually heating the quartz tube to the desired temperature. The temperature was increased at a rate of 20 to 50° C./min under an argon atmosphere. During reduction, annealing, or dewetting (depending on the pretreatment condition), the substrate was kept in a reductive or inert atmosphere (a mixture of hydrogen and argon or argon only) for 20 min. Carbon nanotube growth was conducted by using acetylene and benzene as the carbon source and hydrogen and water vapor for controlling the density and purity of the grown CNT. The prepared CNT membranes were allowed to cool to ~20° C. under a flow of argon saturated with water vapor at 20° C.

Figure 11:
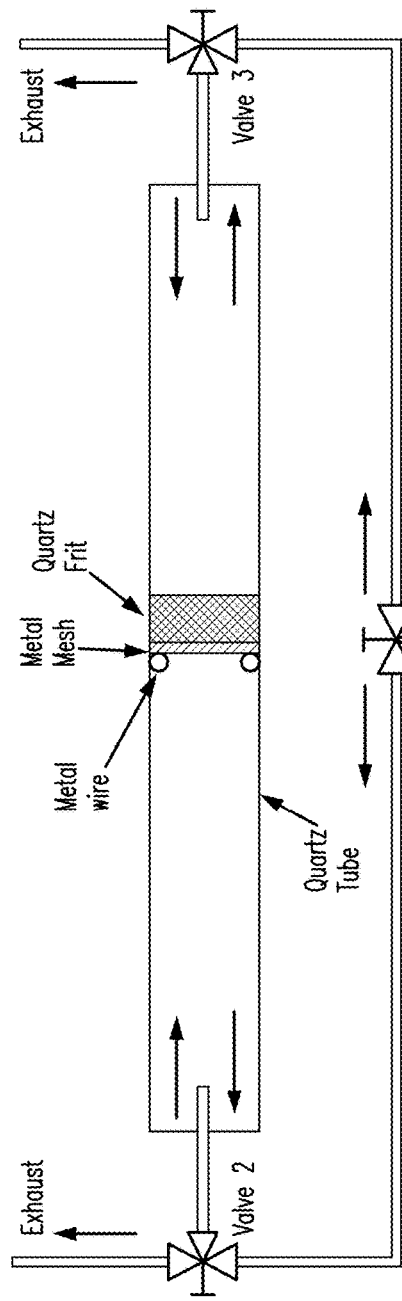
FIG. 11 shows a drawing of a chemical vapor deposition reactor with the substrate oriented perpendicularly to the gas flow by using a customized 26 mm quartz tube with a quartz frit fused in the middle.
Figure 14A:
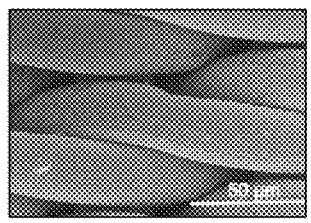
FIG. 14A, FIG. 14B, FIG. 14C, FIG. 14D, and FIG. 14E show the effect of argon plasma on various substrates: HAST (FIG. 14A, FIG. 14B, and FIG. 14C) and SS (FIG. 14D and FIG. 14E) substrates at (FIG. 14A and FIG. 14D) a low power (30 W and 1 min), (FIG. 14B) a high power for a short time (300 W and 5 min), and (FIG. 14C and FIG. 14E) a high power for a long time (300 W and 30 min). All samples were prepared at 750° C.
Figure 14B:
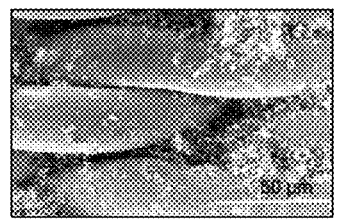
Figure 14C:
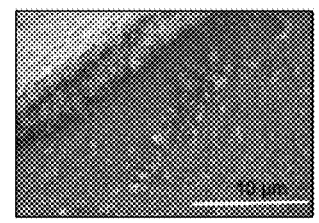
Figure 14D:
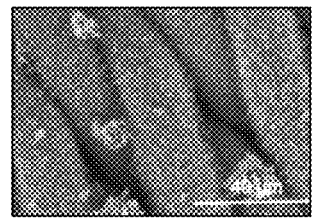
Figure 14E:
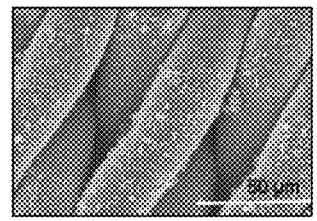

Orienting the substrate horizontally resulted in nonuniformity in the prepared membrane. To obtain more uniformity in CNT growth, the sample was placed perpendicularly to the gas flow, and the gas flow direction was switched from right to left and then in the reverse direction every 5 min. A quartz tube with an internal diameter of 26 mm with a quartz frit fused in the middle was used FIG. 11.

Variations in CNT Growth Based on Different Pretreatments

Characteristics of the grown CNT depended on the types of substrates used and the pretreatments applied. Samples dipped in the electroless nickel solution without initially exposing them to the strike solution, at a low growth temperature, yielded spaghetti-like carbon materials for the HAST substrate (FIG. 12). For the stainless steel (SS) substrate, CNT growth with amorphous carbon could be observed (FIG. 12). Hydrochloric acid etching at a low temperature showed some carbon deposition, but the form was predominantly amorphous carbon (FIG. 12). At a high temperature, both for HCl etching and electroless nickel coating with a HCl strike solution, no carbon deposition was observed (FIG. 13).

Another pretreatment method utilized was bombarding the substrate with argon plasma to introduce roughness (FIG. 14). Different results were observed for the SS and HAST substrates. For SS, high-power argon plasma (300 W) was used for a longer time (30 min), resulting in poor coverage, whereas the low-power (30 W) treatment for a shorter time (1 min) showed denser coverage. For the HAST substrate, however, the low-power plasma treatment for a shorter time resulted in no coverage, whereas the high-power treatment for a longer time was effective for some carbon coverage. These different results were probably caused by the difference in smoothness and composition of the SS and HAST samples.

Both the HAST oxidized in air for 10 min and that sputtered with 50 nm of nickel followed by dewetting at 750° C. showed full coverage by CNT (as discussed in the main text). A similar result was observed for the 50 nm nickel-coated silver membranes (FIG. 15).

In addition to metal, a quartz substrate was investigated because of its exceptional flexibility, temperature, and corrosion resistance. FIG. 16 shows the effect of dipping the substrate in $NiNO_3$ (FIG. 16A, FIG. 16B, FIG. 16C, and FIG. 16D), sputtering, and dewetting the 50 nm (FIG. 16E) and 5 nm (FIG. 16F) sputtered nickel film. For the 5 nm film, the dewetting time was 1 min at 750° C., and for the 50 nm film, it was 20 min at the same temperature. The catalyst-dipped substrate resulted in CNT growth, whereas nickel-sputtered samples resulted in amorphous carbon deposition because the proper types of nickel catalyst sites were lacking.

As discussed above, we also prepared CNTH samples following the methods of Pattinson and co-workers and Vander Wal and Hall and compared them with a CNTH sample prepared based on our method. Samples prepared based on our method have a similar or better CNT network and appear to be free of amorphous carbon impurities (FIG. 17) (References 11 and 15).

Corrosion and Mechanical Strength of Stainless Steel Samples

Samples prepared with SS substrates corroded after exposure to water for several hours (FIG. 18A and FIG. 18B). These samples were fragile and broke easily when clamped for testing (FIG. 18C).

Comparison Between a Commerical Bucky Paper and CNTH-750

The transmission electron microscopy (TEM) image shown in FIG. 19 illustrates the structural similarity between CNT grown on sample CNTH-750 and the commercial CNT sample used for fabricating the bucky paper (BP) used in this work.

The mechanical strength and resistivity to delamination of the developed CNTH-750 membrane were compared with those of a conventional BP membrane (FIG. 20). Upon opening the membrane holder, the BP membrane was torn apart, whereas the CNTH-750 membrane remained intact.

Direct Contact Membrane Distillation

Membrane distillation, a thermally driven separation process in which only vapor passes through the hydrophobic membrane pores, is an emerging technology for water desalination. The mass transfer of water vapor through the membrane is driven by the vapor pressure difference resulting mainly from the temperature difference across the two sides of the membrane (i.e., feed and permeate sides). Direct-contact membrane distillation (DCMD) is a configuration in which liquids are in direct contact with both sides of the membrane. FIG. 21 is a schematic diagram of the bench-scale DCMD experimental setup used in this investigation. The membrane holder illustrated in FIG. 21 is designed for testing 1 in. diameter membranes and consists of two SS compartments. The top and bottom compartments are separated by the tested membrane. Each 1 in. diameter membrane has an effective area of 2.8 $cm^2$ and is sealed in the membrane holder by using proper O-rings. Feed and permeate solutions are circulated at a fixed cross-flow rate of 100 mL/min by using Masterflex peristaltic pumps (Cole Parmer, Vernon Hills, Ill.). The feed solution contains 10,000 ppm of NaCl at 80±2° C., whereas the permeate solution is a premeasured amount of deionized water at ≈5±1° C. Salt concentration was measured by a Thermo Scientific Orion STAR A322 conductivity meter (Thermo Scientific, Waltham, Mass.) equipped with a Thermo Scientific Orion conductivity cell. To promote mixing of the solutions and prevent concentration and heat polarization, stainless membrane spacers were used in the feed and permeate solution channels.

Water flux was measured by recording the weight of the permeate solution with an electronic balance. The reported flux values were averaged over the entire duration of the experiments (45 min). The water flux $J_w$ ($kg/m^2 \cdot h$) through the membrane was calculated by $$J_w = \frac{\Delta M}{A \cdot \Delta t},$$

where $\Delta M$ refers to the change in mass of the feed solution (or permeate solution) with time ($\Delta t$), and A is the effective area of the membrane. The NaCl rejection fraction (R) was calculated by $$R = 1 - \frac{\Delta C \cdot D_f}{C_t},$$

where $\Delta C$ refers to the change in salt concentration (or conductivity) of the permeate solution, $D_f$ is the dilution factor in the permeate side, and $C_t$ is the final salt concentration of the feed.

Direct-contact membrane distillation experiments were conducted in duplicate or triplicate to ensure the reproducibility of the results. Each membrane was tested two times to investigate its stability and robustness. The first tests were conducted with a fresh membrane. These membranes were rinsed with deionized water to remove any existing salt before they were retested for DCMD under the same conditions.

REFERENCES CITED HEREIN (1) Mi, W.; Lin, Y. S.; Li, Y. Vertically Aligned Carbon Nanotube Membranes on Macroporous Alumina Supports. *J. Membr. Sci.* 2007, 304, 1-7.

(2) Camilli, L.; Scarselli, M.; Del Gobbo, S.; Castrucci, P.; Nanni, F.; Gautron, E.; Lefrant, S.; De Crescenzi, M. The Synthesis and Characterization of Carbon Nanotubes Grown by Chemical Vapor Deposition Using a Stainless Steel Catalyst. *Carbon* 2011, 49, 3307-3315.

(3) Kasi, J. K.; Kasi, A. K.; Wongwiriyapan, W.; Afzulpurkar, N.; Dulyaseree, P.; Hasan, M.; Tuantranont, A. Synthesis of Carbon Nanotube and Carbon Nanofiber in Nanopore of Anodic Aluminum Oxide Template by Chemical Vapor Deposition at Atmospheric Pressure. *Adv. Mater. Res.* 2012, 557-559, 544-549.

(4) Park, S. J.; Lee, D. G. Development of CNT-Metal-Filters by Direct Growth of Carbon Nanotubes. *Curr. Appl. Phys.* 2006, 6, 182-186.

(5) Lee, C. H.; Johnson, N.; Drelich, J.; Yap, Y. K. The Performance of Superhydrophobic and Superoleophilic Carbon Nanotube Meshes in Water-Oil Filtration. *Carbon* 2011, 49, 669-676.

(6) Gilani, N.; Daryan, J. T.; Rashidi, A.; Omidkhah, M. R. Separation of Methane-Nitrogen Mixtures Using Synthesis Vertically Aligned Carbon Nanotube Membranes. *Appl. Surf. Sci.* 2012, 258, 4819-4825.

(7) Tuzovskaya, I.; Pacheco Benito, S.; Chinthaginjala, J. K.; Reed, C.; Lefferts, L.; Van Der Meer, T. Heat Exchange Performance of Stainless Steel and Carbon Foams Modified with Carbon Nano Fibers. *Int. J. Heat Mass Transf.* 2012, 55, 5769-5776.

(8) Sano, N.; Kodama, T.; Tamon, H. Direct Synthesis of Carbon Nanotubes on Stainless Steel Electrode for Enhanced Catalyst Efficiency in a Glucose Fuel Cell. *Carbon* 2013, 55, 365-368

(9) Sridhar, S.; Ge, L.; Tiwary, C. S.; Hart, A. C.; Ozden, S.; Kalaga, K.; Lei, S.; Sridhar, S. V.; Sinha, R. K.; Harsh, H.; et al. Enhanced Field Emission Properties from CNT Arrays Synthesized on Inconel Superalloy. *ACS Appl. Mater. Interfaces* 2014, 6, 1986-1991.

(10) Lee, C.; Baik, S. Vertically-Aligned *Carbon* Nano-Tube Membrane Filters with Superhydrophobicity and Superoleophilicity. *Carbon* 2010, 48, 2192-2197.

(11) Vander Wal, R. L.; Hall, L. J. Carbon Nanotube Synthesis upon Stainless Steel Meshes. *Carbon* 2003, 41, 659-672.

(12) Hiraoka, T.; Yamada, T.; Hata, K.; Futaba, D. N.; Kurachi, H.; Uemura, S.; Yumura, M.; Iijima, S. Synthesis of Single- and Double-Walled *Carbon* Nanotube Forests on Conducting Metal Foils. *J. Am. Chem. Soc.* 2006, 128, 13338-13339.

(13) Inagaki, M. *Carbon* Coating for Enhancing the Functionalities of Materials. *Carbon* 2012, 50, 3247-3266.

(14) Hata, K.; Futaba, D. N.; Mizuno, K.; Namai, T.; Yumura, M.; Iijima, S. Water-Assisted Highly Efficient Synthesis of Impurity-Free Single-Walled Carbon Nanotubes. *Science* 2004, 306, 1362-1364.

(15) Pattinson, S. W.; Viswanath, B.; Zakharov, D. N.; Li, J.; Stach, E. A.; Hart, A. J. Mechanism and Enhanced Yield of *Carbon* Nanotube Growth on Stainless Steel by Oxygen-Induced Surface Reconstruction. *Chem. Mater.* 2015, 27, 932-937.

(16) Sano, N.; Yamamoto, S.; Tamon, H. Cr as a Key Factor for Direct Synthesis of Multi-Walled *Carbon* Nanotubes on Industrial Alloys. *Chem. Eng. J.* 2013, 242, 278-284.

(17) Lawson, K. W.; Lloyd, D. R. Membrane Distillation. *J. Membr. Sci.* 1997, 124, 1-25.

(18) Preston, D. J.; Mafra, D. L.; Miljkovic, N.; Kong, J.; Wang, E. N. Scalable Graphene Coatings for Enhanced Condensation Heat Transfer. *Nano Lett.* 2015, 15, 2902-2909.

(19) Journet, C.; Moulinet, S.; Ybert, C.; Purcell, S. T.; Bocquet, L. Contact Angle Measurements on Superhydrophobic Carbon Nanotube Forests: Effect of Fluid Pressure. *Europhys. Lett.* 2005, 71, 104.

(20) Zhang, L.; Resasco, D. E. Single-Walled *Carbon* Nanotube Pillars: A Superhydrophobic Surface. *Langmuir* 2009, 25, 4792-4798.

(21) De Nicola, F.; Castrucci, P.; Scarselli, M.; Nanni, F.; Cacciotti, I.; De Crescenzi, M. Super-Hydrophobic Multi-Walled *Carbon* Nanotube Coatings for Stainless Steel. *Nanotechnology* 2015, 26, 145701.

(22) Lau, K. K. S.; Bico, J.; Teo, K. B. K.; Chhowalla, M.; Amaratunga, G. A. J.; Milne, W. I.; McKinley, G. H.; Gleason, K. K. Superhydrophobic *Carbon* Nanotube Forests. *Nano Lett.* 2003, 3, 1701-1705.

(23) Joseph, P.; Cottin-Bizonne, C.; Benoit, J.-M.; Ybert, C.; Journet, C.; Tabeling, P.; Bocquet, L. Slippage of Water Past Superhydrophobic *Carbon* Nanotube Forests in Microchannels. *Phys. Rev. Lett.* 2006, 97, 156104.

(24) Jeong, D.-W.; Shin, U.-H.; Kim, J. H.; Kim, S.-H.; Lee, H. W.; Kim, J.-M. Stable Hierarchical Superhydrophobic Surfaces Based on Vertically Aligned Carbon Nanotube Forests Modified with Conformal Silicone Coating. *Carbon* 2014, 79, 442-449.

(25) Hummer, G.; Rasaiah, J. C.; Noworyta, J. P. Water Conduction through the Hydrophobic Channel of a Carbon Nanotube. *Nature* 2001, 414, 188-190.

(26) Holt, J. K.; Park, H. G.; Wang, Y.; Stadermann, M.; Artyukhin, A. B.; Grigoropoulos, C. P.; Noy, A.; Bakajin, O. Fast Mass Transport through Sub-2-Nanometer Carbon Nanotubes. *Science* 2006, 312, 1034-1037.

(27) Majumder, M.; Chopra, N.; Andrews, R.; Hinds, B. J. Nanoscale Hydrodynamics: Enhanced Flow in Carbon Nanotubes. *Nature* 2005, 438, 44.

(28) Das, R.; Ali, M. E.; Hamid, S. B. A.; Ramakrishna, S.; Chowdhury, Z. Z. Carbon Nanotube Membranes for Water Purification: A Bright Future in Water Desalination. *Desalination* 2014, 336, 97-109.

(29) Drioli, E.; Ali, A.; Macedonio, F. Membrane Distillation: Recent Developments and Perspectives. *Desalination* 2015, 356, 56-84.

(30) Gethard, K.; Sae-Khow, O.; Mitra, S. Water Desalination Using Carbon-Nanotube-Enhanced Membrane Distillation. *ACS Appl. Mater. Interfaces* 2010, 3, 110-114.

(31) Wang, P.; Chung, T.-S. Recent Advances in Membrane Distillation Processes: Membrane Development, Configuration Design and Application Exploring. *J. Membr. Sci.* 2015, 474, 39-56.

(32) Dumée, L. F.; Sears, K.; Schütz, J.; Finn, N.; Huynh, C.; Hawkins, S.; Duke, M.; Gray, S. Characterization and Evaluation of Carbon Nanotube Bucky-Paper Membranes for Direct Contact Membrane Distillation. *J. Membr. Sci.* 2010, 351, 36-43.

(33) Hashempour, M.; Vicenzo, A.; Zhao, F.; Bestetti, M. Direct Growth of MWCNTs on 316 Stainless Steel by Chemical Vapor Deposition: Effect of Surface Nano-Features on CNT Growth and Structure. *Carbon* 2013, 63, 330-347.

(34) Martinez-Hansen, V.; Latorre, N.; Royo, C.; Romeo, E.; Garcia-Bordejé, E.; Monzón, A. Development of Aligned

(34) [continued] Carbon Nanotubes Layers over Stainless Steel Mesh Monoliths. *Catal. Today* 2009, 147, 71-75.

(35) He, M.; Fedotov, P. V; Obraztsova, E. D.; Viitanen, V.; Sainio, J.; Jiang, H.; Kauppinen, E. I.; Niemelä, M.; Lehtonen, J. Chiral-Selective Growth of Single-Walled Carbon Nanotubes on Stainless Steel Wires. *Carbon* 2012, 50, 4294-4297.

(36) Baddour, C. E.; Fadlallah, F.; Nasuhoglu, D.; Mitra, R.; Vandsburger, L.; Meunier, J.-L. A Simple Thermal CVD Method for Carbon Nanotube Synthesis on Stainless Steel 304 without the Addition of an External Catalyst. *Carbon* 2009, 47, 313-318.

(37) Mata, D.; Ferro, M.; Fernandes, A. J. S.; Amaral, M.; Oliveira, F. J.; Costa, P. M. F. J.; Silva, R. F. Wet-Etched Ni Foils as Active Catalysts towards Carbon Nanofiber Growth. *Carbon* 2010, 48, 2839-2854.

(38) Alvarez, N. T.; Pint, C. L.; Hauge, R. H.; Tour, J. M. Abrasion as a Catalyst Deposition Technique for Carbon Nanotube Growth. *J. Am. Chem. Soc.* 2009, 131, 15041-15048.

(39) Kim, B.; Chung, H.; Chu, K. S.; Yoon, H. G.; Lee, C. J.; Kim, W. Synthesis of Vertically-Aligned Carbon Nanotubes on Stainless Steel by Water-Assisted Chemical Vapor Deposition and Characterization of Their Electrochemical Properties. *Synth. Met.* 2010, 160, 584-587.

(40) Han, Z. J.; Ostrikov, K. Uniform, Dense Arrays of Vertically Aligned, Large-Diameter Single-Walled Carbon Nanotubes. *J. Am. Chem. Soc.* 2012, 134, 6018-6024.

(41) Lepro, X.; Lima, M. D.; Baughman, R. H. Spinnable Carbon Nanotube Forests Grown on Thin, Flexible Metallic Substrates. *Carbon* 2010, 48, 3621-3627.

(42) ChandraKishore, S.; Pandurangan, A. Electrophoretic Deposition of Cobalt Catalyst Layer over Stainless Steel for the High Yield Synthesis of Carbon Nanotubes. *Appl. Surf. Sci.* 2012, 258, 7936-7942.

(43) Zheng, L. X.; O'Connell, M. J.; Doom, S. K.; Liao, X. Z.; Zhao, Y. H.; Akhadov, E. A.; Hoffbauer, M. A.; Roop, B. J.; Jia, Q. X.; Dye, R. C.; et al. Ultralong Single-Wall Carbon Nanotubes. *Nat. Mater.* 2004, 3, 673-676.

(44) Du, C.; Pan, N. CVD Growth of Carbon Nanotubes Directly on Nickel Substrate. *Mater. Lett.* 2005, 59, 1678-1682.

(45) Park, S. J.; Schmidt, A. J.; Tawfick, S. H.; Hart, A. J. Precise Control of Elastocapillary Densification of Nanostructures via Low-Pressure Condensation. *J. Micromech. Microeng.* 2014, 24, 65019.

(46) Shimizu, Y.; Sasaki, T.; Kodaira, T.; Kawaguchi, K.; Terashima, K.; Koshizaki, N. Effect of Plasma Conditions on Fabrication of Multi-Walled Carbon Nanotubes Grown Perpendicularly on Hastelloy C276®. *Diam. Relat. Mater.* 2005, 14, 11-15.

(47) Romero, P.; Oro, R.; Campos, M.; Torralba, J. M.; Guzman de Villoria, R. Simultaneous Synthesis of Vertically Aligned Carbon Nanotubes and Amorphous Carbon Thin Films on Stainless Steel. *Carbon* 2015, 82, 31-38.

(48) Geissler, A.; He, M.; Benoit, J.-M.; Petit, P. Effect of Hydrogen Pressure on the Size of Nickel Nanoparticles Formed during Dewetting and Reduction of Thin Nickel Films. *J. Phys. Chem. C* 2009, 114, 89-92.

(49) Hashempour, M.; Vicenzo, A.; Zhao, F.; Bestetti, M. Effects of CVD Direct Growth of Carbon Nanotubes and Nanofibers on Microstructure and Electrochemical Corrosion Behavior of 316 Stainless Steel. *Mater. Charact.* 2014, 92, 64-76.

(50) Dresselhaus, M. S.; Jorio, A.; Hofmann, M.; Dresselhaus, G.; Saito, R. Perspectives on Carbon Nanotubes and Graphene Raman Spectroscopy. *Nano Lett.* 2010, 10, 751-758.

(51) Osswald, S.; Havel, M.; Gogotsi, Y. Monitoring Oxidation of Multiwalled Carbon Nanotubes by Raman Spectroscopy. *J. Raman Spectrosc.* 2007, 38, 728-736.

(52) Delhaes, P.; Couzi, M.; Trinquecoste, M.; Dentzer, J.; Hamidou, H.; Vix-Guterl, C. A Comparison between Raman Spectroscopy and Surface Characterizations of Multiwall Carbon Nanotubes. *Carbon* 2006, 44, 3005-3013.

(53) Park, S.-J.; Kim, K.-S. Surface Characterization of Carbon Materials by X-Ray Photoelectron Spectroscopy. *Mendez-Vilas A, Diaz J. Microsc. Sci. Technol. Appl. Educ. Formatex* 2010, 1905-1916.

(54) Datsyuk, V.; Kalyva, M.; Papagelis, K.; Parthenios, J.; Tasis, D.; Siokou, A.; Kallitsis, I.; Galiotis, C. Chemical Oxidation of Multiwalled Carbon Nanotubes. *Carbon* 2008, 46, 833-840.

(55) Ashraf, A.; Wu, Y.; Wang, M. C.; Alum, N. R.; Dastgheib, S. A.; Nam, S. Spectroscopic Investigation of the Wettability of Multilayer Graphene Using Highly Ordered Pyrolytic Graphite as a Model Material. *Langmuir* 2014, 30, 12827-12836.

(56) *Standard Test Methods for Measuring Adhesion by Tape Test*; ASTM D3359; ASTM International: West Conshohocken, Pa., 2005.

(57) Azimi, G.; Dhiman, R.; Kwon, H.-M.; Paxson, A. T.; Varanasi, K. K. Hydrophobicity of Rare-Earth Oxide Ceramics. *Nat. Mater.* 2013, 12, 315-320.

(58) Tomaszewska, M.; Mientka, A. Separation of HCl from HCl—H$_2$SO$_4$ Solutions by Membrane Distillation. *Desalination* 2009, 240, 244-250.

(59) *Standard Test Methods for Pore Size Characteristics of Membrane Filters by Bubble Point and Mean Flow Pore Test*; ASTM F316-03; ASTM International: West Conshohocken, Pa., 2003.

(60) Ashraf, A.; Wu, Y.; Wang, M. C.; Alum, N. R.; Dastgheib, S. A.; Nam, S. Spectroscopic Investigation of the Wettability of Multilayer Graphene Using Highly Ordered Pyrolytic Graphite as a Model Material. *Langmuir* 2014, 30, 12827-12836.

(61) Singh and Sirkar (D. Singh, K. K. Sirkar, Desalination of brine and produced water by direct contact membrane distillation at high temperatures and pressures, J. Memb. Sci. 389 (2012) 380-388.

(62) T. Laoui, A. M. Al-Amer, A. B. Khalil, A. Abbas, M Khraisheh, M. A. Atieh, et al., Novel anti-microbial membrane for desalination pretreatment: a silver nanoparticle-doped carbon nanotube membrane, Desalination 376 (2015) 82-93.)

(63) Y. Yue, X. Huang, X. Wang, Thermal transport in multiwall carbon nanotube buckypapers, Phys. Lett. A. 374 (2010) 4144-4151.

(64) D. M. Price, M. Jarratt, Thermal conductivity of PTFE and PTFE composites, Thermochim. Acta. 392 (2002) 231-236.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the present invention, where the term "comprises" or "comprising" is used with respect to the components etc., it is also contemplated that the alternative "consists essentially of" or "consisting essentially of", or "consists of" or "consisting of", can as appropriate and upon the context be alternatively recited. Further, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, because upon mixing certain components can further react or be transformed into additional materials.

All percentages and ratios used herein, unless otherwise indicated, are by weight.

What is claimed is:

1. A carbon nanotube membrane comprising a substrate coated with carbon nanotubes, wherein the substrate has micrometer-sized openings and wherein the substrate is selected from silver, nickel sputtered silver, Hastelloy C22 (HAST) and quartz fiber filter.

2. The carbon nanotube membrane according to claim 1, wherein the carbon nanotube membrane is resistant to thermal and oxidative weight loss up to about 500° C.

3. The carbon nanotube membrane according to claim 1, wherein the carbon nanotube membrane is superhydrophobic.

4. The carbon nanotube membrane according to claim 1, wherein the carbon nanotube membrane has pore openings of about 0.5 nm to about 500 nm.

5. The carbon nanotube membrane according to claim 1, wherein the carbon nanotube membrane is flexible, non-fragile, and resistant to delamination and corrosive conditions, compared to a membrane with a stainless steel substrate.

6. A carbon nanotube membrane according to claim 1, which is resistant to corrosion in acids or salt solutions, compared to a membrane with a stainless steel substrate.

7. A carbon nanotube membrane according to claim 6 wherein the acid is selected from hydrochloric acid, sulfuric acid, phosphoric acid, and nitric acid and wherein the salt solution is selected from a solution of sodium chloride or calcium chloride.

8. A carbon nanotube membrane according to claim 1 which is resistant to corrosion in water or humid conditions, compared to a membrane with a stainless steel substrate.

9. A carbon nanotube membrane according to claim 1 which is resistant to delamination and disintegration of the CNT structure, as determined in an adhesion performance test according to ASTM D3359 or as determined in a sonication performance test for 40 seconds at a frequency of 20 KHz and an input energy of 240 W/L using a Fisher Scientific F550 sonic dismembrator or equivalent instrument.

* * * * *